(12) United States Patent
Yamazaki et al.

(10) Patent No.: US 12,387,574 B2
(45) Date of Patent: Aug. 12, 2025

(54) CONTROL DEVICE, BEHAVIOR GUIDE SYSTEM, AND METHOD FOR CONTROLLING SAME

(71) Applicant: TOSHIBA TEC KABUSHIKI KAISHA, Tokyo (JP)

(72) Inventors: Keita Yamazaki, Mishima Shizuoka (JP); Yuishi Takeno, Numazu Shizuoka (JP); Takuya Kamitani, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/666,859

(22) Filed: May 17, 2024

(65) Prior Publication Data

US 2025/0140085 A1 May 1, 2025

(30) Foreign Application Priority Data

Oct. 25, 2023 (JP) .................. 2023-183466

(51) Int. Cl.
*G07G 1/01* (2006.01)
*G06V 40/10* (2022.01)
(Continued)

(52) U.S. Cl.
CPC .............. *G07G 1/01* (2013.01); *G06V 40/10* (2022.01); *G06V 40/20* (2022.01); *G07G 1/0045* (2013.01)

(58) Field of Classification Search
CPC ...... G07G 1/01; G07G 1/0045; G07G 1/0036; G06V 40/10; G06V 40/20; G06Q 20/20
(Continued)

(56) References Cited

U.S. PATENT DOCUMENTS

2008/0249859 A1* 10/2008 Angell ............... G06Q 30/0255
705/14.39
2019/0088096 A1* 3/2019 King ................ G08B 13/19665
(Continued)

FOREIGN PATENT DOCUMENTS

JP 2013-152634 8/2013

*Primary Examiner* — Edwyn Labaze
(74) *Attorney, Agent, or Firm* — Amin, Turocy & Watson, LLP

(57) ABSTRACT

A control device includes a behavior recognition unit, a determination unit, a subsequent behavior annunciation unit, a correct behavior annunciation unit, and a warning unit. The behavior recognition unit recognizes a behavior executed by a shopper. The determination unit determines a subsequent behavior as the behavior for the shopper to subsequently perform based on the behavior recognized by the behavior recognition unit. The subsequent behavior annunciation unit makes an annunciation member disposed so as to correspond to a behavior area where the subsequent behavior is to be executed operate in a first annunciation configuration based on the subsequent behavior determined by the determination unit. The correct behavior annunciation unit makes the annunciation member operate in a second annunciation configuration when the behavior recognition unit recognizes that the shopper executes the subsequent behavior. The warning unit which makes the annunciation member disposed so as to correspond to the behavior area where a different behavior from the subsequent behavior is executed operate in a warning configuration when the behavior recognition unit recognizes that the shopper executes the different behavior.

20 Claims, 11 Drawing Sheets

(51) Int. Cl.
*G06V 40/20* (2022.01)
*G07G 1/00* (2006.01)

(58) Field of Classification Search
USPC .............. 235/383, 375, 381, 487; 705/14.37, 705/14.38, 14.25
See application file for complete search history.

(56) References Cited

U.S. PATENT DOCUMENTS

2023/0056327 A1* 2/2023 Brakob .................. G06V 20/44
2024/0193993 A1* 6/2024 Ishida .................... G06V 20/52
2024/0193995 A1* 6/2024 Ishida .................... G06V 20/52

* cited by examiner

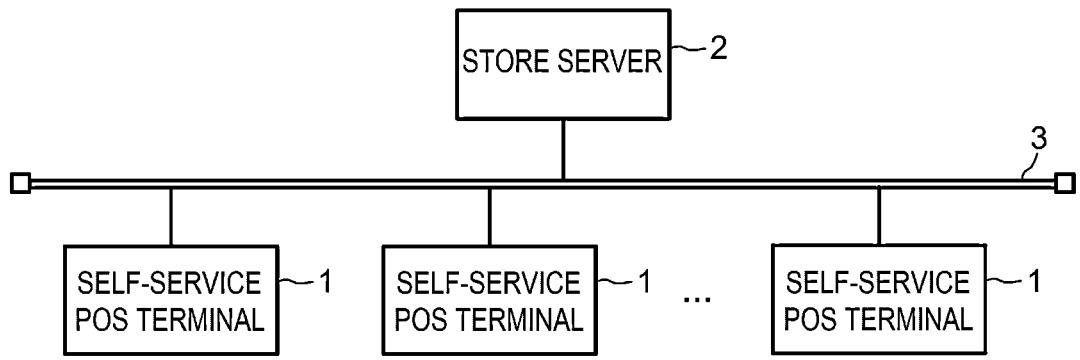
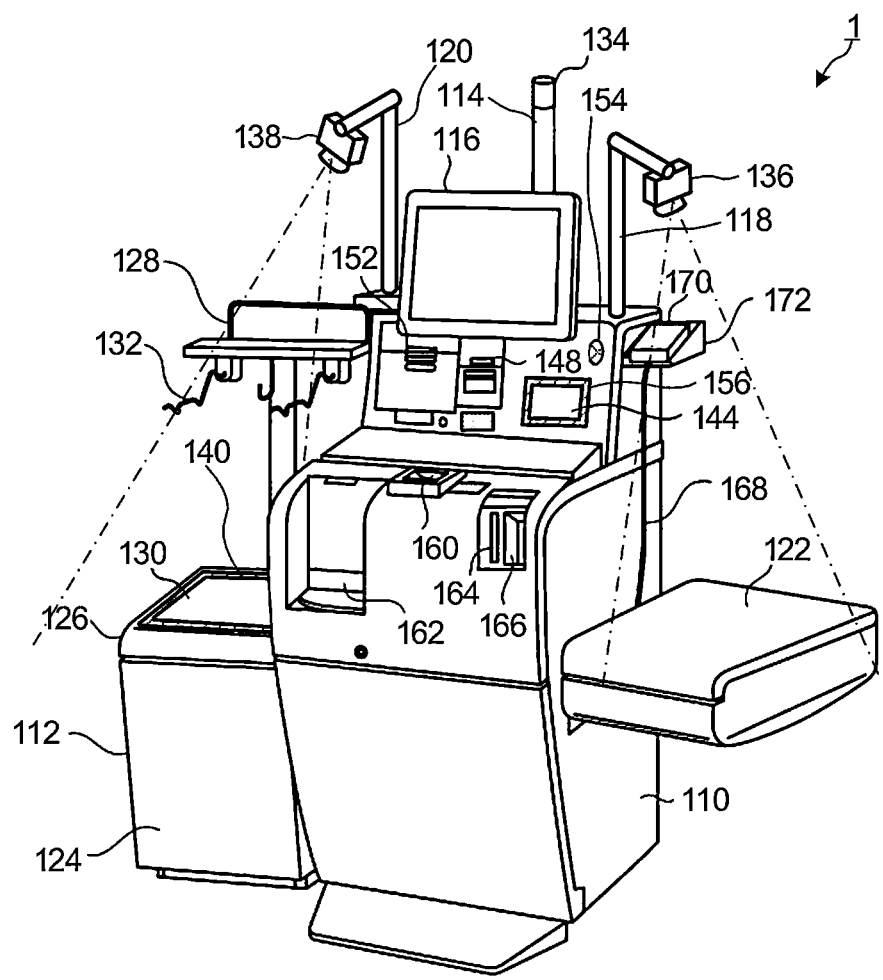

CONTROL DEVICE, BEHAVIOR GUIDE SYSTEM, AND METHOD FOR CONTROLLING SAME

CROSS-REFERENCE TO RELATED APPLICATION

This application is based upon and claims the benefit of priority from Japanese Patent Application No. 2023-183466, filed on Oct. 25, 2023, the entire contents of which are incorporated herein by reference.

FIELD

Embodiments of the present disclosure relate to a control device, a behavior guide system, and a method for controlling the same.

BACKGROUND

In recent years, there are an increasing number of stores which are provided with self-service checkout terminals each called a self-service POS terminal for the user to execute the registration of an article to be purchased and settlement processing by him- or herself, and which adopt a sales configuration in which a shopper executes the registration of an article and the settlement processing. In general, in such a self-service POS terminal, the shoppers scan a code symbol attached to an article with a scanner to execute the registration of the article.

In such a self-service POS terminal, a variety of techniques for preventing cheating are proposed. For example, there is proposed a technique of making a robot face follow the article gripped by a customer to thereby provide the user of the terminal with an impression of being monitored, and thus, achieving prevention of an occurrence of the cheating such as shoplifting. Further, there is also disclosed in this technique that the fact that some kind of operation failure or fraud is made is announced toward a sales clerk as an attendant or the like.

In the past, there was no such a system that a shopper as a user was visually informed of whether the behavior was correct or wrong with respect to the operation at that time. Therefore, the prevention of an involuntary erroneous behavior and a willful illicit behavior of the user was not achieved.

DESCRIPTION OF THE DRAWINGS

FIG. 1 is a schematic configuration diagram showing a settlement system of a self-service type including a self-service POS terminal to which a behavior guide system according to a first embodiment including a control device according to the first embodiment is applied.

FIG. 2 is a perspective view showing an example of an appearance configuration of the self-service POS terminal.

DETAILED DESCRIPTION

Figure 3:
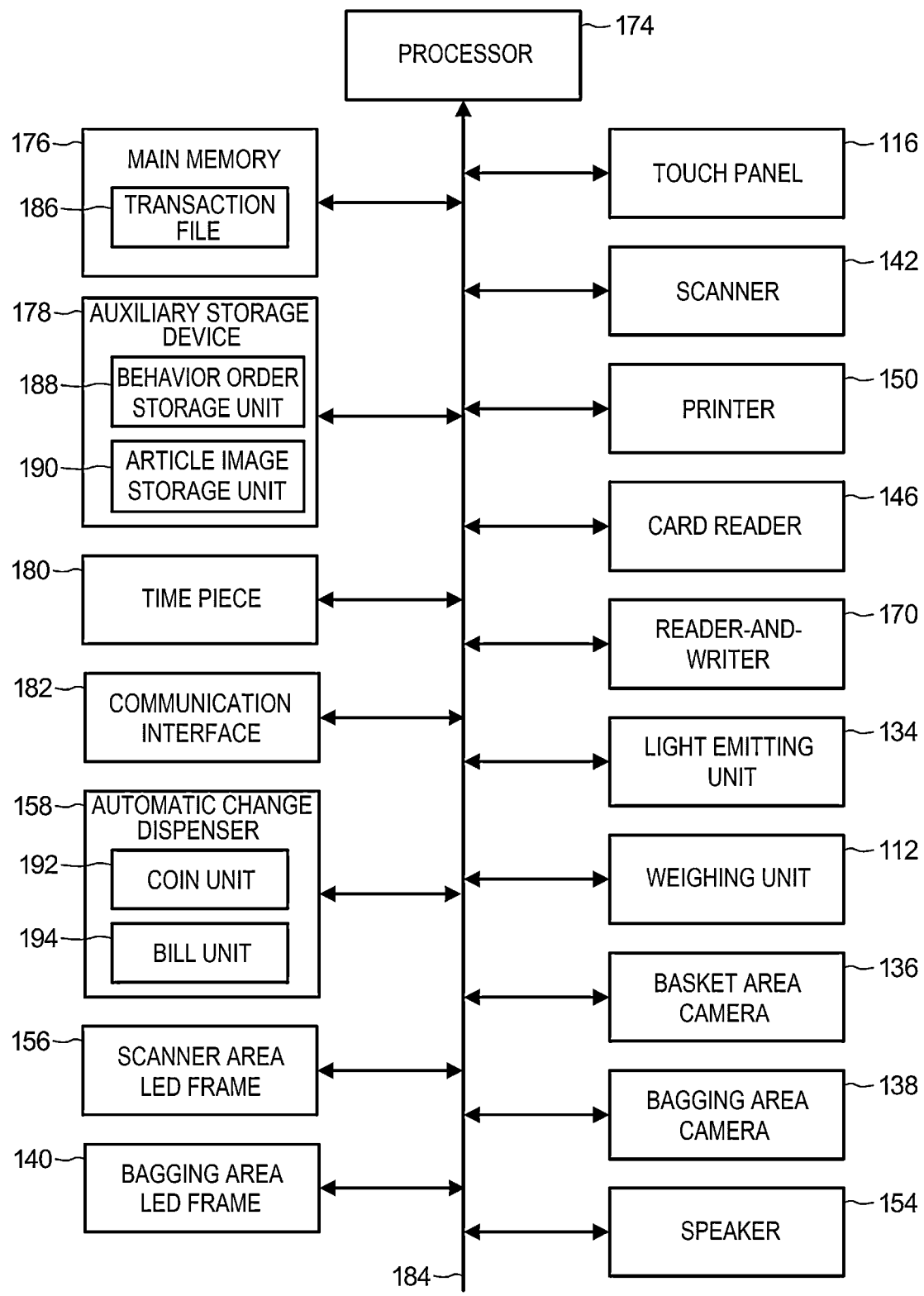
FIG. 3 is a block diagram showing an example of circuit configuration of an essential part of the self-service POS terminal.

A problem to be solved by the embodiments of the present disclosure is to provide a control device, a behavior guide system, and a method for controlling the behavior guide system which can prevent an involuntary erroneous behavior and a willful illicit behavior of a shopper as a user.

In one embodiment, a control device is for controlling the annunciation members disposed so as to correspond respectively to a plurality of behavior areas where a plurality of behaviors included in a series of behaviors to be executed by a shopper is executed, and includes a behavior recognition unit, a determination unit, a subsequent behavior annunciation unit, a correct behavior annunciation unit, and a warning unit. The behavior recognition unit recognizes a behavior executed by a shopper. The determination unit determines a subsequent behavior as the behavior for the shopper to subsequently perform based on the behavior recognized by the behavior recognition unit. The subsequent behavior annunciation unit makes an annunciation member disposed so as to correspond to a behavior area where the subsequent behavior is to be executed operate in a first annunciation configuration based on the subsequent behavior determined by the determination unit. The correct behavior annunciation unit makes the annunciation member operate in a second annunciation configuration when the behavior recognition unit recognizes that the shopper executes the subsequent behavior. The warning unit which makes the annunciation member disposed so as to correspond to the behavior area where a different behavior from the subsequent behavior is executed operate in a warning configuration when the behavior recognition unit recognizes that the shopper executes the different behavior.

Some embodiments of a control device will hereinafter be described using the drawings.

First Embodiment

In the present embodiment, an explanation will be presented citing a settlement system of a self-service type as an example.

FIG. 1 is a schematic configuration diagram showing the settlement system of a self-service type including a self-service POS terminal to which a behavior guide system according to a first embodiment including a control device according to the first embodiment is applied. The settlement system includes a plurality of self-service POS terminals 1 and a store server 2. The settlement system connects the self-service POS terminals 1 and the store server 2 to each other with a communication network 3 such as a local area network (LAN). The store server 2 provides a variety of services related to the present settlement system to each of the self-service POS terminals 1 connected with the communication network 3.

The self-service POS terminals 1 as an example of the behavior guide system according to the first embodiment are installed in a payment place of a store, and a shopper who completes shopping is a user thereof. A customer who puts a purchased article into a shopping basket in a sales floor where articles are displayed, and then moves to the payment place operates the self-service POS terminal 1 to execute payment of the purchased article, namely a settlement related to a transaction from the registration of the article to the payment, by him- or herself. The self-service POS terminal 1 is an example of a settlement device which deals with a full-self-service settlement. The settlement device can be reworded as a settlement terminal, a payment device, a payment terminal, an article registration device, an article registration terminal, and so on.

FIG. 2 is a perspective view showing an appearance configuration of the self-service POS terminal 1, and FIG. 3 is a block diagram showing a circuit configuration of an essential part of the self-service POS terminal 1.

As shown in FIG. 2, the self-service POS terminal 1 is provided with a main body 110 installed on a floor surface, and a weighing unit 112 disposed at the side of the main body 110. The main body 110 is attached with a display pole 114, a touch panel 116, and two camera poles 118, 120 in an upper part thereof. In the main body 110, a basket table 122 is disposed in a central portion on a side surface at an opposite side to the side at which the weighing unit 112 is disposed. The basket table 122 is for the customer from the sales floor to place the basket containing the purchased article. The customer stands in front of the main body 110 in FIG. 2 so as to be able to see a screen of the touch panel 116 to perform an operation. Therefore, in a customer view, the basket table 122 is located at the right side, and the weighing unit 112 is located at the left side across the main body 110. In the following description, a side at which the customer stands is defined as the front of the main body 110, a side at which the weighing unit 112 is disposed is defined as the left side of the main body 110, and a side at which the basket table 122 is disposed is defined as the right side of the main body 110.

The weighing unit 112 has a structure in which a weighing plate 126 is disposed in an upper part of a housing 124, and a bag holding tool 128 is attached above the weighing plate 126. An upper surface of the weighing plate 126 is defined as a placement surface 130. The bag holding tool 128 is provided with a pair of holding arms 132, and a plastic store bag or a shopping bag brought by the customer, a so-called own-bag, is held with these holding arms 132. The weighing unit 112 measures the weight of the article placed which is put inside the plastic store bag or the own-bag held by the holding arms 132 and is placed on the placement surface 130.

The display pole 114 is provided with a light emitting unit 134 which selectively emits, for example, blue light and red light in a tip portion thereof. The display pole 114 displays the status of the self-service POS terminal 1 such as standby, in-operation, waiting for attendant, and halt with error using the colors of the light emitted by the light emitting unit 134.

The touch panel 116 is configured by a display for displaying a variety of screens to the user who operates the self-service POS terminal 1, and a touch sensor for detecting touch input to the screen by the user. In the self-service POS terminal 1, the user is normally a shopper.

The camera pole 118 is attached with a basket area camera 136, and the camera pole 120 is attached with a bagging area camera 138.

A mounting position and the posture of the basket area camera 136 are set so that the basket table 122 is included in the field angle, namely an imaging area, as indicated by dashed-dotted lines in FIG. 2. More specifically, the imaging area of the basket area camera 136 is set so that the inside of the shopping basket placed on the basket table 122 can be imaged from above. The imaging area of the basket area camera 136 is hereinafter referred to as a basket area.

A mounting position and the posture of the bagging area camera 138 are set so that the placement surface 130 of the weighing plate 126 of the weighing unit 112 is included in the field angle, namely an imaging area, as indicated by dashed-dotted lines in FIG. 2. More specifically, the imaging area of the bagging area camera 138 is set so that an opening part for inputting an article of the plastic store bag or the own-bag held by the holding arms 132 can be imaged from above. The imaging area of the bagging area camera 138 is hereinafter referred to as a bagging area.

In the placement surface 130 of the weighing plate 126, a bagging area LED frame 140 for clearly showing the bagging area to a shopper is embedded. The bagging area LED frame 140 is provided with a plurality of green LED, a plurality of yellow LED, and a plurality of red LED, and is thus capable of presenting the bagging area to the shopper as a green frame, a yellow frame, or a red frame.

It should be noted that although not particularly illustrated, it is possible to provide substantially the same LED frame also to the basket table 122.

A reading window 144 of a scanner 142 (see FIG. 3), a card slot 148 of a card reader 146 (see FIG. 3), an issue port 152 for a receipt printed by a printer 150 (see FIG. 3), and a speaker 154 are formed on a front surface of the main body 110. A scanner area LED frame 156 is disposed so as to surround the periphery of the reading window 144 of the scanner 142. Similarly to the bagging area LED frame 140, the scanner area LED frame 156 is provided with a plurality of green LED, a plurality of yellow LED, and a plurality of red LED, and is thus capable of presenting the reading window 144, namely a scanner area, to the shopper as a green frame, a yellow frame, or a red frame. Further, on the front surface of the main body 110, a coin slot 160 of an automatic change dispenser 158 (see FIG. 3), a coin dispensing port 162, a bill slot 164, and a bill dispensing port 166 are also formed.

The bagging area LED frame 140 and the scanner area LED frame 156 are an example of the annunciation members disposed so as to correspond respectively to a plurality of behavior areas where a plurality of behaviors included in a series of behaviors to be executed by a shopper is executed. The bagging area and the scanner area are an example of the plurality of behavior areas. The bagging area LED frame 140 and the scanner area LED frame 156 are an example of the visual annunciation members and the light emitting members.

Further, a communication cable 168 extends from a right side surface of the main body 110 to the outside, and a reader-and-writer 170 for an electronic medium is coupled to a tip of the communication cable 168. The reader-and-writer 170 is placed on a placement table 172 provided to an upper portion on a right side surface of the main body 110.

As shown in FIG. 3, the self-service POS terminal 1 is provided with a processor 174, a main memory 176, an auxiliary storage device 178, a time piece 180, a communication interface 182, and a system transmission path 184 in addition to the weighing unit 112, the touch panel 116, the light emitting unit 134, the basket area camera 136, the bagging area camera 138, the bagging area LED frame 140, the scanner 142, the card reader 146, the printer 150, the speaker 154, the scanner area LED frame 156, the automatic change dispenser 158, and the reader-and-writer 170 described above. The system transmission path 184 includes an address bus, a data bus, control signal lines, and so on. The system transmission path 184 couples the processor 174 and other units to each other directly, or via a signal input-and-output circuit, and transmits data signals which are mutually received or transmitted therebetween. The processor 174, the main memory 176, and the auxiliary storage device 178 are coupled to each other with the system transmission path 184 to thereby configure a computer of the self-service POS terminal 1. The computer is an example of a control device according to the first embodiment which controls the annunciation members disposed so as to correspond respectively to the plurality of behavior areas where the plurality of behaviors included in the series of behaviors to be executed by a shopper is executed.

The processor 174 corresponds to a central portion of the computer described above. The processor 174 controls each unit so as to realize a variety of types of functions as the self-service POS terminal 1 with an operating system or an application program. The processor 174 is, for example, a central processing unit (CPU). The processor 174 can also be, for example, a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 174 can be what is obtained by combining some of these with each other.

The main memory 176 corresponds to a main storage portion of the computer described above. The main memory 176 includes a nonvolatile memory area and a volatile memory area. The main memory 176 stores the operating system or the application program in the nonvolatile memory area. The main memory 176 stores data which is necessary for the processor 174 to execute processing for controlling each unit in the nonvolatile memory area or the volatile memory area in some cases. For example, the main memory 176 stores a transaction file 186. The transaction file 186 is a data file for storing the data related to one commercial transaction to be processed by the self-service POS terminal 1. The transaction file 186 stores data such as a transaction number, purchased article data, the total number of items, a total amount, a discount amount, and a settlement amount. The transaction numbers are series of numbers issued every time the commercial transaction is processed by the self-service POS terminal 1. The purchased article data is the record data generated for each of the articles traded in the commercial transaction identified by the transaction number. Here, the purchased article data is formed of items such as an article code, an article mane, a price, the number of pieces, an amount. The number of pieces is the number of the purchased articles identified by the article code. The amount is the total amount corresponding to the number of purchased pieces. The transaction file 186 can store a plurality of purchased article data. The total number of pieces is the number of pieces obtained by combining the numbers of pieces in the respective purchased article data with each other. The total amount is an amount obtained by combining the amounts in the respective purchased article data with each other. The discount amount is a reduction amount with respect to the total amount. The settlement amount is an amount obtained by subtracting the discount amount from the total amount. The main memory 176 uses the volatile memory area as a work area in which data is rewritten as appropriate by the processor 174. The nonvolatile memory area is, for example, a read only memory (ROM). The volatile memory area is, for example, a random access memory (RAM).

The auxiliary storage device 178 corresponds to an auxiliary storage portion of the computer described above. For example, an electrically erasable programmable read-only memory (EEPROM), a hard disc drive (HDD), or a solid state drive (SSD) may be the auxiliary storage device 178. The auxiliary storage device 178 stores data which is used by the processor 174 when performing a variety of types of processing, data which is generated by the processing in the processor 174, and so on. For example, the auxiliary storage device 178 includes a behavior order storage unit 188 and an article image storage unit 190. It should be noted that the auxiliary storage device 178 stores the application program described above in some cases.

The behavior order storage unit 188 stores an order of the series of behaviors for the shopper to be required to perform with the self-service POS terminal 1. The series of behaviors include, for example, a bag setting behavior of setting a bag such as the plastic store bag or the own-bag to the weighing unit 112, a scanning behavior of scanning the code symbol attached to the article with the scanner 142 in order to perform the registration of the purchased article, and a bagging behavior of inputting the article thus scanned in the shopping bag, and the behavior order storage unit 188 stores the order of the behaviors in which order. The behavior order storage unit 188 is an example of a storage unit which stores the order of the plurality of behaviors to be performed when the shopper executes the registration of the purchased article.

The article image storage unit 190 stores an appearance image of each of the articles to be sold in the store.

The time piece 180 measures the time. The processor 174 performs the processing taking the time measured by the time piece 180 as the current time.

The communication interface 182 performs data communication in compliance with a communication protocol set in advance with an external device which is connected via a network. The external device is, for example, the store server 2.

The scanner 142 reads the code symbol from the article put over the reading window 144. To each of the articles to be sold in a store, the code symbol obtained by coding an article ID or the like for identifying that article is attached. The code symbol is, for example, a barcode. The code symbol may be, for example, a two-dimensional data code. The scanner 142 may be of a type which reads the code symbol by scanning with a laser beam, or of a type which reads the code symbol from an image taken by an imaging device.

The card reader 146 reads card data recorded on a card medium such as a credit card or a reward card. The card reader 146 draws in the card medium inserted into the card slot 148 inside the main body 110 to read the card data, and then discharges the card medium from the card slot 148.

The printer 150 prints a receipt data representing a content of a business transaction or the like on a receipt form. The receipt form on which the receipt data is printed is discharged from an issue port 152, cut by a cutter not shown, and then issued as a receipt or a voucher.

The speaker 154 emits a voice message and an annunciation sound.

The automatic change dispenser 158 includes a coin unit 192 and a bill unit 194. The coin unit 192 sorts out coins dropped in a coin slot 160 one by one to identify the denomination, and then houses the coins in a safe by denomination. The coin unit 192 takes out the coins of the corresponding denomination from the safe based on, for example, change data, and then pays them out to a coin dispensing port 162. The bill unit 194 sorts out bills inserted in the bill slot 164 one by one to identify the denomination, and then houses the bills in the safe by denomination. The bill unit 194 takes out the bills of the corresponding denomination from the safe based on, for example, change data, and then pays them out to the bill dispensing port 166.

The reader-and-writer 170 performs reading and rewriting of electronic money recorded on an electronic money medium. The electronic money medium is, for example, a noncontact IC card. The electronic money medium may also be an electronic device such as a smartphone or a tablet terminal.

The operation of the self-service POS terminal 1 having such a configuration will hereinafter be described.

Figure 4:
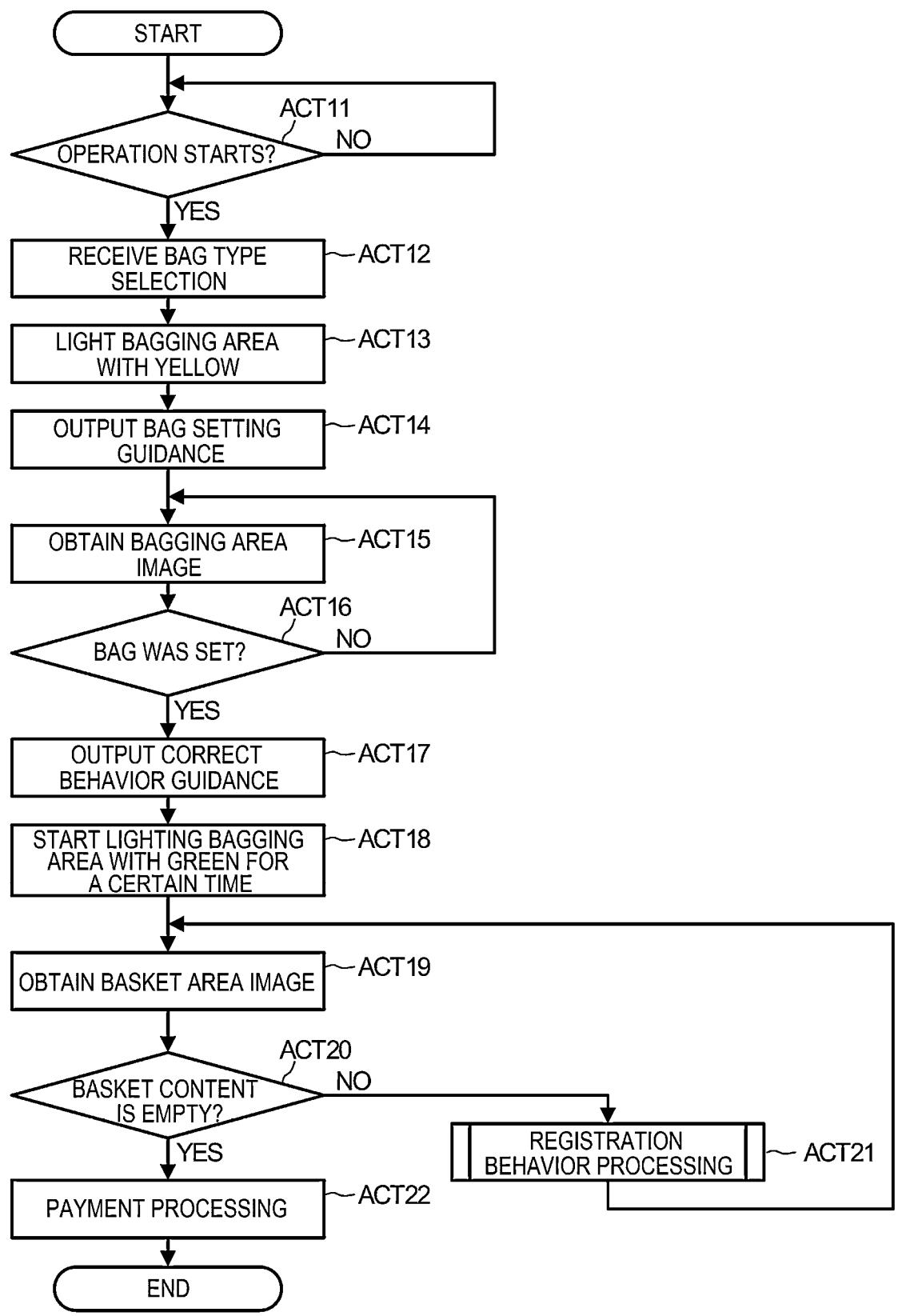
FIG. 4 is a flowchart representing an example of a procedure of an essential part of information processing to be executed by a processor of the self-service POS terminal.

FIG. 4 is a flowchart representing an example of a procedure of an essential part of information processing to be executed by the processor 174 of the self-service POS terminal 1. It should be noted that the processing operation of the processor 174 shown in FIG. 4 makes the transition to ACT(n+1) after ACTn (n is a natural number) unless specifically described. Further, the procedure shown in FIG. 4 is illustrative only. The procedure is not particularly limited as long as substantially the same result can be obtained.

As ACT11, the processor 174 awaits a start of an operation by the shopper. For example, when the processor 174 starts the operation in response to power activation, the processor 174 displays "please touch" or the like on the display of the touch panel 116, and then gets into a standby state. In ACT11, whether the touch panel 116 was touched is determined. When a touch on the touch panel 116 by the shopper does not occur, the processor 174 determines NO in ACT11, and then repeats ACT11. When the touch panel 116 is touched by the shopper, the processor 174 determines YES in ACT11, and then proceeds to ACT12.

As ACT12, the processor 174 awaits bag type selection by the shopper. For example, the processor 174 displays a selection screen regarding whether to buy the plastic store bag or to use the own-bag on the display of the touch panel 116, and then receives the selection operation by the shopper. When the selection operation is performed, the processor 174 proceeds to ACT13. The processor 174 which executes the processing in ACT12 is an example of a behavior recognition unit for recognizing the behavior executed by the shopper, and at the same time, an example of a determination unit for determining a subsequent behavior as a behavior which the shopper should subsequently perform based on the behavior recognized by the behavior recognition unit.

As ACT13, the processor 174 lights the bagging area LED frame 140 with the yellow color as an attention-seeking color.

As ACT14, the processor 174 outputs bag setting guidance. For example, the processor 174 performs a guidance display of "please set a bag" on the display of the touch panel 116, and at the same time, outputs similar sound guidance from the speaker 154. The processor 174 which executes the processing in ACT13 is an example of a subsequent behavior annunciation unit which makes the annunciation member disposed so as to correspond to the behavior area where the subsequent behavior should be executed operate in a first annunciation configuration based on the subsequent behavior determined by the determination unit. The bagging area LED frame 140 is an example of the annunciation member disposed so as to correspond to the behavior area in which the subsequent behavior should be executed. The lighting with the yellow color is an example of an operation in the first annunciation configuration.

Then, the processor 174 executes a behavior detection with respect to the bag setting behavior which is the first behavior in the series of behaviors stored in the behavior order storage unit 188, and in which the shopper sets a bag such as the plastic store bag or the own-bag to the weighing unit 112.

Specifically, first, as ACT15, the processor 174 obtains a bagging area image taken by the bagging area camera 138.

Then, as ACT16, the processor 174 determines whether a bag, namely the plastic store bag or the own-bag, is set to the weighing unit 112 based on the bagging area image. Specifically, the processor 174 recognizes an area of a hand of the shopper from the bagging area image to determine whether the hand entered the bagging area. For example, the processor 174 detects the position of the hand using a technique of an object detection such as a single shot multibox detector (SSD) known to the public, or a technique of a posture estimation such as OpenPose. It should be noted that regarding the bagging area, as described above, it is assumed that the bagging area camera 138 is installed so that the placement surface 130 is included in the field angle, namely the imaging area, thereof, but by detecting the bagging area in real time using the technique of the object detection such as SSD, it is possible to make it unnecessary to exactly set the mounting position and the posture of the bagging area camera 138. When no bag is set, the processor 174 determines NO in ACT16, and then proceeds to ACT15. When the bag is set, the processor 174 determines YES in ACT16, and then proceeds to ACT17. It should be noted that in determining whether the bag is set, it is possible to use a change in value of a weight sensor or the like provided to the weighing unit 112. The processor 174 which executes the processing in ACT16 is an example of the behavior recognition unit for recognizing the behavior executed by the shopper.

As ACT17, the processor 174 outputs correct behavior guidance. For example, the processor 174 outputs a sound effect representing a correct answer such as "ding-dong" from the speaker 154.

As ACT18, the processor 174 starts lighting the bagging area LED frame 140 which was lit with the yellow color in ACT13 with the green color for a certain period of time. The certain period of time is not exactly regulated, but is sufficiently a period of time necessary for the shopper to start taking out the article located in the shopping basket placed on the basket table 122 from when the shopper set the bag. The certain period of time is, for example, about 1 second. The processor 174 which executes the processing in ACT18 is an example of the correct behavior annunciation unit which makes the annunciation member operating in the first annunciation configuration operate in a second annunciation configuration different from the first annunciation configuration when the behavior recognition unit recognized that the shopper executed the subsequent behavior. The lighting with the green color for the certain period of time is an example of an operation in the second annunciation configuration.

Then, the processor 174 executes the behavior detection regarding the scanning behavior of the shopper scanning the code symbol attached to the article with the scanner 142 in order to perform the registration of the purchased article and the bagging behavior of the shopper inputting the article thus scanned in the shopping bag as the subsequent behavior in the series of behaviors stored in the behavior order storage unit 188.

First, as ACT19, the processor 174 obtains a basket area image taken by the basket area camera 136.

As ACT20, the processor 174 determines whether the content of the shopping basket plated on the basket table 122 is empty from the basket area image using a known image recognition processing technique. When the content of the shopping basket is not empty, namely when an article not yet scanned remains, the processor 174 determines NO in ACT20, and then proceeds to ACT21. The processor 174 which executes the processing in ACT20 is an example of the behavior recognition unit for recognizing the behavior executed by the shopper, and at the same time, an example of the determination unit for determining the subsequent behavior as the behavior which the shopper should subsequently perform based on the behavior recognized by the behavior recognition unit.

As ACT 21, the processor 174 executes registration behavior processing as a substance of the behavior detection with respect to the scanning behavior and the bagging behavior.

Figure 5:
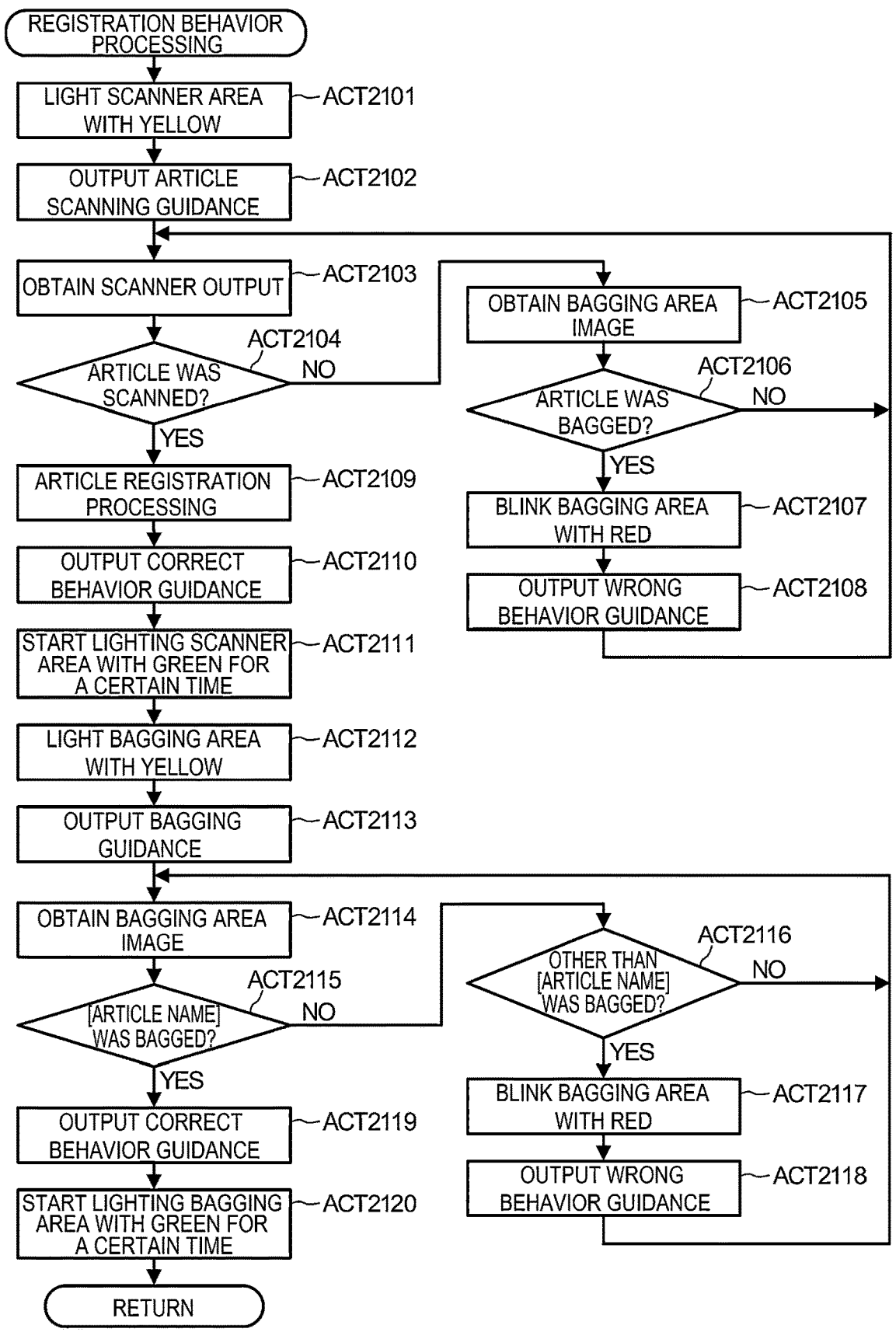
FIG. 5 is a flowchart showing an example of a detailed procedure of registration behavior processing in FIG. 4.

FIG. 5 is a flowchart showing an example of a detailed procedure of the registration behavior processing in ACT21. The processor 174 first executes the behavior detection with respect to the scanning behavior.

Specifically, first, as ACT2101, the processor 174 lights the scanner area LED frame 156 disposed on the periphery of the reading window 144 of the scanner 142 with the yellow color as the attention-seeking color. The processor 174 which executes the processing in ACT2101 is an example of the subsequent behavior annunciation unit which makes the annunciation member disposed so as to correspond to the behavior area where the subsequent behavior should be executed operate in the first annunciation configuration based on the subsequent behavior determined by the determination unit. The scanner area LED frame 156 is an example of the annunciation member disposed so as to correspond to the behavior area in which the subsequent behavior should be executed. The lighting with the yellow color is an example of the operation in the first annunciation configuration.

As ACT2102, the processor 174 outputs article scanning guidance. For example, the processor 174 performs a guidance display of "please scan articles" on the display of the touch panel 116, and at the same time, outputs similar sound guidance from the speaker 154.

As ACT2103, the processor 174 obtains the output of the scanner 142.

As ACT2103, the processor 174 determines whether the article is scanned. When the code symbol attached to the article is scanned by the scanner 142, it is possible for the processor 174 to obtain the article code represented by the code symbol from the scanner 142. Therefore, depending on whether the article code is obtained, it is possible for the processor 174 to determine whether the article was scanned. When the article was scanned, the processor 174 determines YES in ACT2104, and then proceeds to ACT2109. When the article was not scanned, the processor 174 determines NO in ACT2104, and then proceeds to ACT2105. The processor 174 which executes the processing in ACT2104 is an example of the behavior recognition unit for recognizing the behavior executed by the shopper, and at the same time, an example of the determination unit for determining the subsequent behavior as the behavior which the shopper should subsequently perform based on the behavior recognized by the behavior recognition unit.

As ACT2105, the processor 174 obtains the bagging area image taken by the bagging area camera 138.

As ACT2106, the processor 174 determines whether the article was bagged based on the bagging area image. Specifically, it is possible for the processor 174 to determine whether the article was bagged by recognizing the area of the hand of the shopper from the bagging area image to determine whether the hand entered the bagging area. When the article is not bagged, the processor 174 determines NO in ACT2106, and then proceeds to ACT2103. The processor 174 which executes the processing in ACT2106 is an example of the behavior recognition unit for recognizing the behavior executed by the shopper.

Due to such a processing loop in ACT2103 through ACT2106 as described above, the processor 174 gets into a standby state for scanning of articles. It should be noted that as long as the certain period of time described above does not elapse, the green lighting of the bagging area LED frame 140 continues in some cases during the standby state for scanning of articles.

When the article which was not scanned is bagged during the standby state for scanning of articles, the processor 174 determines YES in ACT2106, and proceeds to ACT2107. As ACT2107, the processor 174 blinks the bagging area LED frame 140 with the red color as a warning color. The processor 174 which executes the processing in ACT2107 is an example a warning unit which makes the annunciation member disposed so as to correspond to the behavior area where a different behavior from the subsequent behavior is executed operate in a warning configuration different from the first and second annunciation configurations when the behavior recognition unit recognized that the shopper executed the different behavior. The blinking with the red color is an example of the operation in the warning configuration.

As ACT2108, the processor 174 outputs wrong behavior guidance. For example, the processor 174 outputs a warning voice such as "please scan the article before bagging" from the speaker 154, and at the same time, displays a similar warning message on the display of the touch panel 116 for a predetermined period of time. Subsequently, the processor 174 makes the transition to the processing in ACT2103.

When the article was scanned during the standby state for scanning of articles in the processing loop in ACT2103 through ACT2106, the processor 174 determines YES in ACT2104, and proceeds to ACT2109. As ACT2109, the processor 174 executes article registration processing with the article code of the article thus obtained. The article registration processing is known to the public, and therefore, the description thereof will be omitted. Thus, the article sales data regarding the article thus scanned are stored in the transaction file 186.

As ACT2110, the processor 174 outputs the correct behavior guidance. For example, the processor 174 outputs the sound effect representing the correct answer such as "ding-dong" from the speaker 154.

As ACT2111, the processor 174 starts lighting the scanner area LED frame 156 which was lit with the yellow color in ACT2101, with the green color for a certain period of time. This certain period of time is not exactly regulated, and is sufficiently a time necessary for the shopper to start bagging the article which was scanned. The certain period of time is, for example, about 1 second. The processor 174 which executes the processing in ACT2111 is an example of the correct behavior annunciation unit which makes the annunciation member operating in the first annunciation configuration operate in the second annunciation configuration different from the first annunciation configuration when the behavior recognition unit recognized that the shopper executed the subsequent behavior. The lighting with the green color for the certain period of time is an example of the operation in the second annunciation configuration.

Then, the processor 174 executes the behavior detection with respect to the bagging behavior. Specifically, first, as ACT2112, the processor 174 lights the bagging area LED frame 140 with the yellow color as the attention-seeking color. The processor 174 which executes the processing in ACT2112 is an example of the subsequent behavior annunciation unit which makes the annunciation member disposed so as to correspond to the behavior area where the subsequent behavior should be executed operate in the first annunciation configuration based on the subsequent behavior determined by the determination unit. The bagging area LED frame 140 is an example of the annunciation member disposed so as to correspond to the behavior area in which the subsequent behavior should be executed. The lighting with the yellow color is an example of the operation in the first annunciation configuration.

As ACT2113, the processor 174 outputs bagging guidance. For example, the processor 174 performs a guidance display of "please bag [article name]" on the display of the touch panel 116, and at the same time, outputs similar sound guidance from the speaker 154. Here, [article name] is the article name of the article corresponding to the article code registered in ACT2109.

As ACT2114, the processor 174 obtains the bagging area image taken by the bagging area camera 138.

As ACT2115, the processor 174 determines whether the article named [article name] was bagged based on the bagging area image. Specifically, the processor 174 recognizes an area of a hand of the shopper from the bagging area image to determine whether the hand entered the bagging area. The method of detecting the position of the hand is as described in ACT16. Further, the processor 174 applies a known technique such as template matching to the image of the periphery of the hand to thereby determine whether the image of the article gripped by the hand coincides with the image of the article named [article name]. It should be noted that the images of the articles are stored in the article image storage unit 190 of the auxiliary storage device 178. In this way, it is possible for the processor 174 to determine bagging of the article named [article name]. When the article named [article name] was bagged, the processor 174 determines YES in ACT2115, and then proceeds to ACT2119.

When the article named [article name] is not bagged, the processor 174 determines NO in ACT2115, and then proceeds to ACT2116. The processor 174 which executes the processing in ACT2115 is an example of the behavior recognition unit for recognizing the behavior executed by the shopper, and at the same time, an example of the determination unit for determining the subsequent behavior as the behavior which the shopper should subsequently perform based on the behavior recognized by the behavior recognition unit.

As ACT2116, the processor 174 determines whether other articles than the article named [article name] are bagged. When other articles than the article named [article name] are also not bagged, the processor 174 determines NO in ACT2116, and then proceeds to ACT2114. The processor 174 which executes the processing in ACT2116 is an example of the behavior recognition unit for recognizing the behavior executed by the shopper.

Due to such a processing loop in ACT2114 through ACT2116 as described above, the processor 174 gets into a standby state for bagging of the article named [article name]. It should be noted that as long as the certain period of time described above does not elapse, the green lighting of the scanner area LED frame 156 continues in some cases during the standby state for bagging of articles.

When an article other than the article named [article name] is bagged during the standby state for bagging of articles, the processor 174 determines YES in ACT2116, and proceeds to ACT2117. As ACT2117, the processor 174 blinks the bagging area LED frame 140 with the red color as the warning color. The processor 174 which executes the processing in ACT2117 is an example of the warning unit which makes the annunciation member disposed so as to correspond to the behavior area where a different behavior from the subsequent behavior is executed operate in the warning configuration different from the first and second annunciation configurations when the behavior recognition unit recognized that the shopper executed the different behavior. The blinking with the red color is an example of the operation in the warning configuration.

As ACT2118, the processor 174 outputs the wrong behavior guidance. For example, the processor 174 outputs a warning voice such as "please bag the scanned article" from the speaker 154, and at the same time, displays a similar warning message on the display of the touch panel 116 for a predetermined period of time. Subsequently, the processor 174 makes the transition to the processing in ACT2114.

As ACT2119, the processor 174 outputs the correct behavior guidance. For example, the processor 174 outputs the sound effect representing the correct answer such as "ding-dong" from the speaker 154.

As ACT2120, the processor 174 starts lighting the bagging area LED frame 140 which was lit with the yellow color in ACT2112 with the green color for a certain period of time. The certain period of time is not exactly regulated, but is sufficiently a period of time necessary for the shopper to start taking out the next article located in the shopping basket placed on the basket table 122 from when the shopper bags the present article. The certain period of time is, for example, about 1 second. Subsequently, the processor 174 returns to the higher-level routine. The processor 174 which executes the processing in ACT2120 is an example of the correct behavior annunciation unit which makes the annunciation member operating in the first annunciation configuration operate in the second annunciation configuration different from the first annunciation configuration when the behavior recognition unit recognized that the shopper executed the subsequent behavior. The lighting with the green color for the certain period of time is an example of the operation in the second annunciation configuration.

It should be noted that ACT18, ACT2111, and ACT2120 may be the same in certain period of time as each other, or may be different in certain period of time from each other.

Referring back to the description of FIG. 4, when the processing of the scanning behavior and the bagging behavior with respect to one article in the shopping basket as the registration behavior processing in ACT21 is completed, the processor 174 proceeds to ACT19. In this way, during the processing loop in ACT19 through ACT21, the registration and the bagging with respect to each of the articles in the shopping basket by the shopper are executed as a result. When the registration and the bagging of all the articles in the shopping basket are completed, and thus, the content of the shopping basket becomes empty, the processor 174 determines YES in ACT20, and then proceeds to ACT22.

As ACT22, the processor 174 executes payment processing based on the article sales data stored in the transaction file 186. The payment processing is known to the public, and therefore, the description thereof will be omitted. Thus, the shopper executes the payment of the purchased article.

As described above, the computer including the processor 174 of the self-service POS terminal 1 is the control device according to the first embodiment which controls the annunciation members disposed so as to correspond respectively to the plurality of behavior areas where the plurality of behaviors included in the series of behaviors to be executed by the shopper is executed, and recognizes the behavior executed by the shopper to make the annunciation member disposed so as to correspond to the behavior area where the subsequent behavior is performed operate in accordance with the subsequent behavior which should subsequently be performed to thereby provide the shopper with the guidance on the behavior which should subsequently be performed, and where to perform the behavior. Then, when the subsequent behavior was correctly executed by the shopper, this fact is announced with that annunciation member, or when a wrong behavior was executed, warning is performed with the annunciation member disposed so as to correspond to the behavior area where the wrong behavior was executed. Therefore, the processor 174 configures the behavior recognition unit for recognizing the behavior executed by the shopper, the determination unit for determining the subsequent behavior as the behavior which the shopper should subsequently perform based on the behavior recognized by the behavior recognition unit, the subsequent behavior annunciation unit which makes the annunciation member disposed so as to correspond to the behavior area where the subsequent behavior should be executed operate in the first annunciation configuration based on the subsequent behavior determined by the determination unit, the correct behavior annunciation unit which makes the annunciation member operating in the first annunciation configuration operate in a second annunciation configuration different from the first annunciation configuration when the behavior recognition unit recognized that the shopper executed the subsequent behavior, and the warning unit which makes the annunciation member disposed so as to correspond to the behavior area where a different behavior from the subsequent behavior is executed operate in the warning configuration different from first and second annunciation the configurations when the behavior recognition unit recognized that the shopper executed the different behavior.

As described above, according to the self-service POS terminal 1 including the control device related to the first embodiment, when the wrong behavior was executed as the subsequent behavior by the shopper, a warning against this fact is given to the shopper, and therefore, it becomes possible to prevent an involuntary erroneous behavior and a willful illicit behavior of the shopper.

Further, the series of behaviors to be executed by the shopper include a plurality of behaviors which the shopper performs when executing the registration of the purchased article, the computer of the self-service POS terminal 1 includes the behavior order storage unit 188 which stores the order of the plurality of behaviors to be performed when executing the registration of the purchased article in the auxiliary storage device 178, and the processor 174 which configures the determination unit determines the subsequent behavior based on the order of the behaviors stored in the behavior order storage unit 188.

Therefore, according to the self-service POS terminal 1 in the first embodiment, it is possible to easily determine the subsequent behavior to announce the subsequent behavior to the shopper.

It should be noted that the plurality of behaviors includes at least the scanning behavior of scanning the code symbol attached to the purchased article with the scanner 142, and the processor 174 which configures the behavior recognition unit recognizes the fact that the shopper executed the scanning behavior based on the output of the scanner 142.

Therefore, according to the self-service POS terminal 1 in the first embodiment, it becomes possible to surely announce the registration behavior of the purchased article as an essential behavior to the shopper.

Further, the annunciation members include visual annunciation members, and the first annunciation configuration, the second annunciation configuration, and the warning configuration by the processor 174 are different in visual annunciation configuration of the visual annunciation members from each other.

Therefore, it becomes possible to make the shopper surely recognize the behavior area where the subsequent behavior should be performed, and whether the correct behavior was performed in that behavior area.

It should be noted that the visual annunciation members each include the light emitting member as the LED frame, and the first annunciation configuration, the second annunciation configuration, and the warning configuration are different in at least one of color of the emitted light and lighting pattern from each other.

Therefore, it is possible to make the annunciation configurations visually and clearly different from each other.

Second Embodiment

Then, a second embodiment will be described. In the present embodiment, the description will be presented citing, as an example, a settlement system including a pre-registration system in which the customer him- or herself performs the article registration of a purchased article in advance of checkout in a payment machine using an information terminal which is attached to a shopping cart and is capable of reading an article code, or an information terminal which is provided with a scanning function for the customer him- or herself to perform reading of the article during shopping in a store. It should be noted that the configurations and operations substantially the same as those in the first embodiment will be attached with substantially the same reference symbols as in the first embodiment to thereby omit the description thereof.

Figure 6:
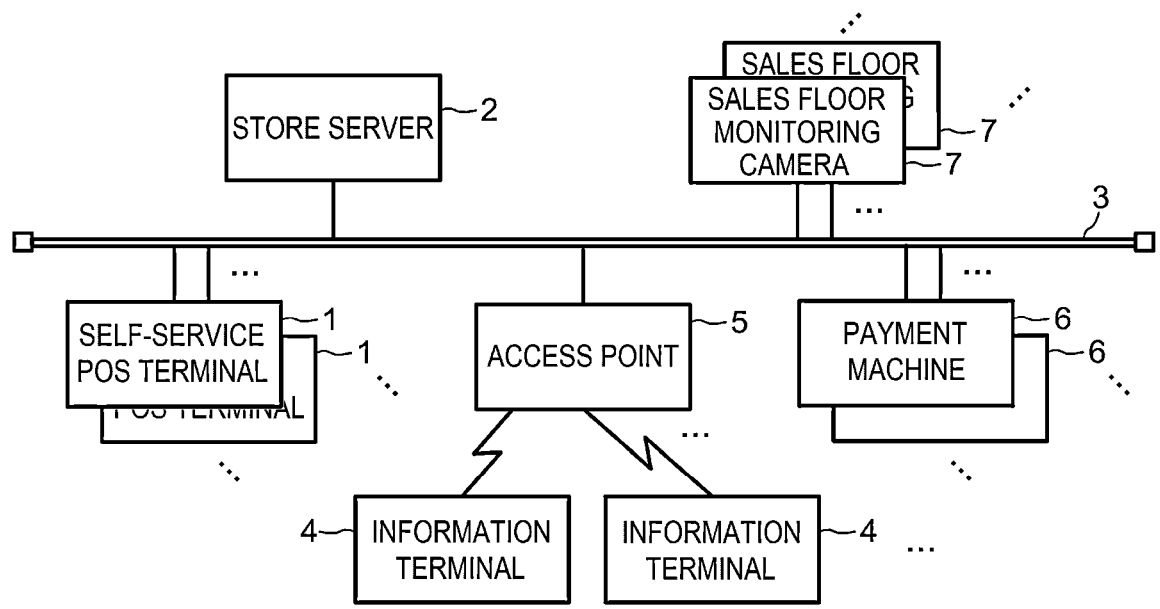
FIG. 6 is a schematic configuration diagram showing a settlement system of a self-service type including an information terminal to which a behavior guide system according to a second embodiment including a control device according to the second embodiment is applied.

FIG. 6 is a schematic configuration diagram showing a self-service type settlement system including an information terminal 4 to which a behavior guide system according to the second embodiment including a control device according to the second embodiment is applied. The settlement system according to the second embodiment includes the information terminal 4, an access point 5, and a plurality of payment machines 6 in addition to the communication network 3, the plurality of self-service POS terminals 1, and the store server 2. It should be noted that just one access point 5 is shown in FIG. 6, but the number of the access points 5 may be two or more.

The information terminal 4 is a terminal for the shopper to perform the article registration during shopping in the store. The access point 5 is a wireless base station for connecting the information terminal 4 to the communication network 3. The information terminal 4 does not have the transaction file, and transmits the article code to the store server 2 via the access point 5 together with a terminal ID of that information terminal 4 to thereby store the transaction data in the transaction file for each of the information terminals 4, namely each of the shoppers, provided to the store server 2. It should be noted that it is also possible to connect another management device from the store server 2 to the communication network 3, and manage the transaction file for each of the information terminals 4 in that management device. The payment machines 6 are each a checkout apparatus for the shopper to perform payment based on the transaction data for each of the information terminals 4 stored in the store server 2. It should be noted that it is possible to provide the self-service POS terminal 1 with a function of the payment machine 6.

Further, it is possible for the settlement system to be provided with a plurality of sales floor monitoring cameras 7 connected to the communication network 3. The sales floor monitoring cameras 7 are disposed on, for example, the ceiling of each of the sales floors in the store, and shoot a condition in which the shopper scans an article arranged on a display shelf or the like, or input an article into a shopping basket mounted on a shopping cart from above the sales floor. A sales floor image taken by each of the sales floor monitoring cameras 7 is transmitted to the store server 2, and is used for monitoring the sales floor. Further, it is also possible to arrange that the sales floor image can be transmitted to the information terminal 4 which is included in the field angle, namely the imaging area, of each of the sales floor monitoring cameras 7. On this occasion, by installing a transmitter and a receiver of, for example, a radio field intensity with each of the access points 5 or a beacon in the sales floor and the information terminals 4 or the shopping cart, the store server 2 determines the location of each of the information terminals 4 to transmit the sales floor image of corresponding one of the sales floor monitoring cameras 7.

Figure 7:
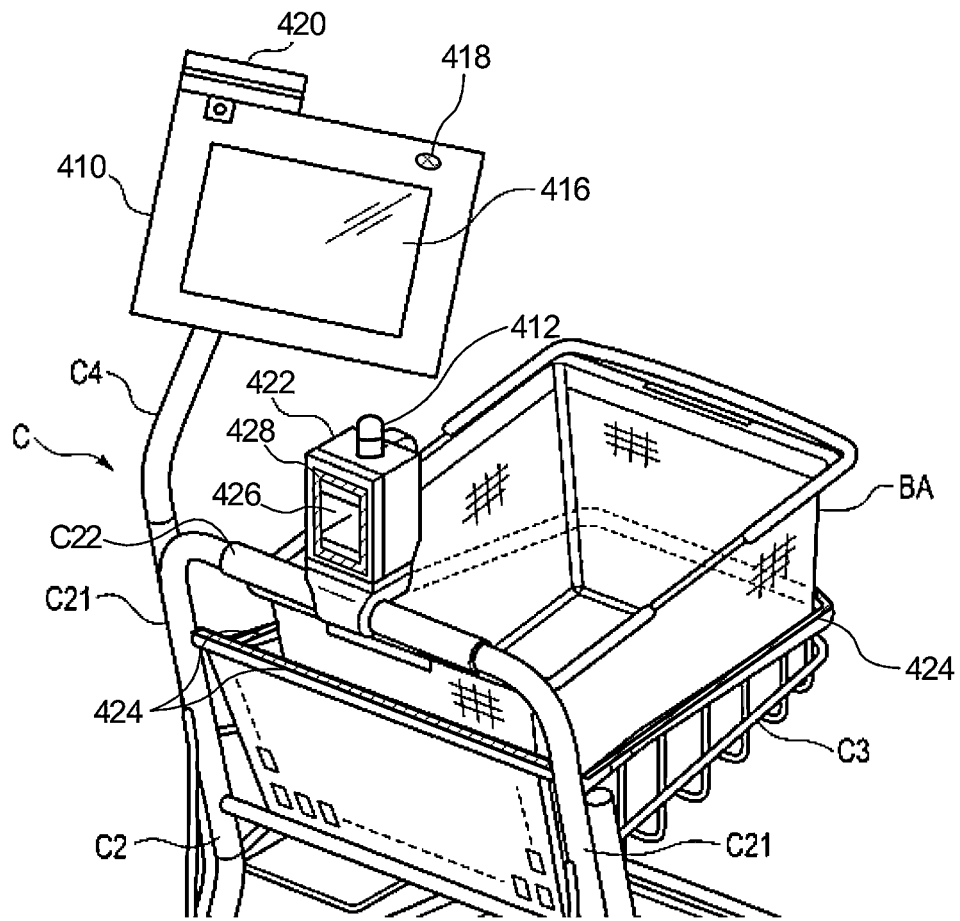
FIG. 7 is a perspective view showing an example of an appearance configuration of the information terminal attached to a shopping cart.
Figure 8:
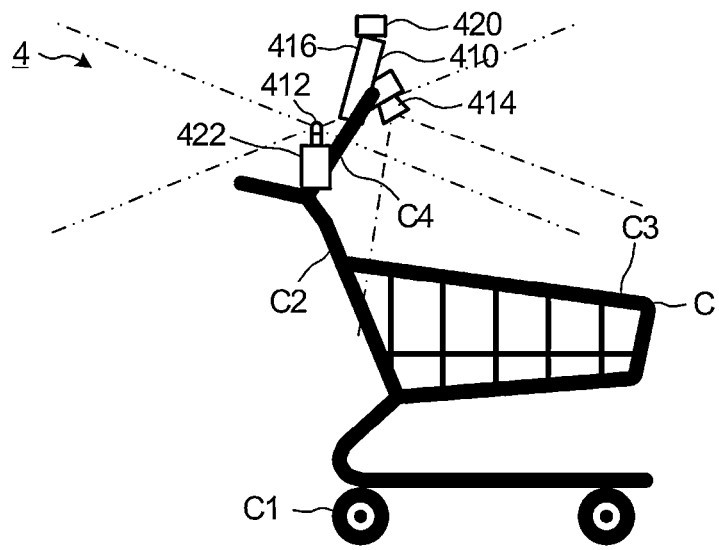
FIG. 8 is a schematic diagram illustrating imaging ranges of a surrounding area camera and a basket area camera provided to the information terminal.

FIG. 7 is a perspective view showing an example of an appearance configuration of the information terminal 4 attached to the shopping cart C. Further, FIG. 8 is schematic diagram illustrating the imaging ranges of a surrounding area camera 412 and a basket area camera 414 which are provided to the information terminal 4, and are configured separately from a main body 410 of the information terminal 4.

The information terminal 4 includes the main body 410 which is provided with a touch panel 416 and a speaker 418, and which is attached with a card reader 420, and a scanner 422 separated from the main body 410.

The shopping cart C is provided with a caster unit C1 for moving, a handle frame unit C2, and a basket holder C3. The caster unit C1 includes wheels (four wheels) for smoothly moving on a floor surface. The handle frame unit C2 includes a pair of longitudinal frames C21, C21 erected at a rear wheel side of the caster unit C1, and a handle bar C22 which couples upper ends of these longitudinal frames C21, C21. The basket holder C3 is located frontward from a middle region of the handle frame unit C2. The shopping cart C loads a shopping basket BA for housing an article on each of the basket holder C3 and the caster unit C1.

In the shopping cart C, a pole C4 is attached to one of the longitudinal frames C21. A tip of the pole C4 is located above the handle bar C22. The main body 410 is attached to a tip portion of the pole C4 so that a screen of the touch panel 416 is located toward the rear side. The car reader 420 is attached to the main body 410 so that a card slit is located toward the back side. In FIG. 7, a magnetic card reader is adopted as the card reader 420. The scanner 422 is located at a middle portion of the handle bar C22. The scanner 422 is attached to the handle bar C22 so that a reading window is located toward the front side.

The surrounding area camera 412 is attached to, for example, an upper surface of the scanner 422. The surrounding area camera 412 is, for example, an omnidirectional camera, and is attached so that all circumferential directions of the shopping cart C are included in the field angle, namely the imaging area, as indicated by dashed-two dotted lines in FIG. 8. Thus, regardless of the positional relationship between the shopping cart C and the article which is picked up by the shopper from the article shelf, the condition thereof is imaged by the surrounding area camera 412. The imaging area of the surrounding area camera 412 is hereinafter referred to as a surrounding area.

As shown in FIG. 8, the basket area camera 141 is attached to a rear surface of the main body 410 which is located at the front side of the shopping cart C. A mounting position and the posture of the basket area camera 414 are set so that the basket holder C3 is included in the field angle, namely the imaging area, as indicated by dashed-dotted lines in FIG. 8. More specifically, the imaging area of the basket area camera 414 is set so that the inside of the shopping basket BA housed in the basket holder C3 can be imaged from obliquely above. The imaging area of the basket area camera 414 is hereinafter referred to as a basket area.

A basket area LED frame 424 is attached to an upper surface of the basket holder C3 so as to surround the shopping basket BA housed in the basket holder C3. Similarly to the bagging area LED frame 140 in the first embodiment, the basket area LED frame 424 is provided with a plurality of green LED, a plurality of yellow LED, and a plurality of red LED, and is thus capable of presenting a bagging area to the shopper as a green frame, a yellow frame, or a red frame.

Further, a scanner area LED frame 428 is disposed so as to surround the periphery of a reading window 426 of the scanner 422. Similarly to the scanner area LED frame 156 in the first embodiment, the scanner area LED frame 428 is also provided with a plurality of green LED, a plurality of yellow LED, and a plurality of red LED, and is thus capable of presenting the reading window 426, namely a scanner area, to the shopper as a green frame, a yellow frame, or a red frame.

The basket area LED frame 424 and the scanner area LED frame 428 are an example of annunciation members disposed so as to correspond respectively to a plurality of behavior areas where a plurality of behaviors included in a series of behaviors to be executed by a shopper is executed. The basket holder C3 and the scanner area are an example of the plurality of behavior areas. The basket area LED frame 424 and the scanner area LED frame 428 are an example of the visual annunciation members and the light emitting members.

Figure 9:
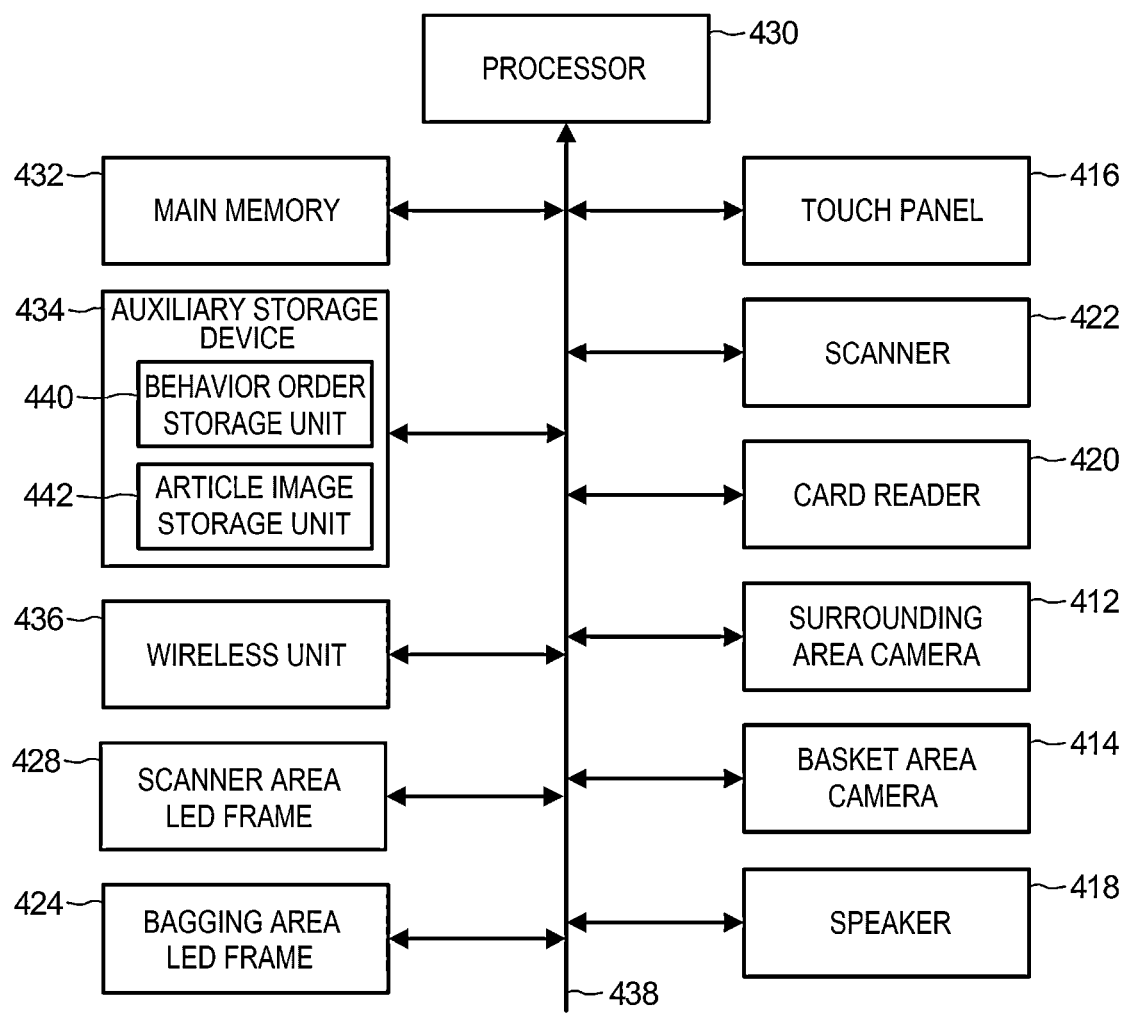
FIG. 9 is a block diagram showing an example of a circuit configuration of an essential part of the information terminal.

FIG. 9 is a block diagram showing an example of a circuit configuration of an essential part of the information terminal 4. As shown in FIG. 9, the information terminal 4 is provided with a processor 430, a main memory 432, an auxiliary storage device 434, a wireless unit 436, and a system transmission path 438 in addition to the surrounding area camera 412, the basket area camera 414, the touch panel 416, the speaker 418, the card reader 420, the scanner 422, the basket area LED frame 424, and the scanner area LED frame 428 described above. The system transmission path 438 includes an address bus, a data bus, control signal lines, and so on. The system transmission path 438 couples the processor 430 and other units to each other directly, or via a signal input-and-output circuit, and transmits data signals which are mutually received or transmitted therebetween. The processor 430, the main memory 432, and the auxiliary storage device 434 are coupled to each other with the system transmission path 438 to thereby configure a computer of the information terminal 4. The computer is an example of a control device according to the second embodiment which controls the annunciation members disposed So as to correspond respectively to the plurality of behavior areas where the plurality of behaviors included in the series of behaviors to be executed by a shopper is executed.

The processor 430 corresponds to a central portion of the computer described above. The processor 430 controls each unit so as to realize a variety of types of functions as the information terminal 4 with an operating system or an application program. The processor 430 may be, for example, a CPU, an MPU, an SoC, a DSP, a GPU, and an ASIC, a PLD, or an FPGA similarly to the processor 174 of the self-service POS terminal 1. Alternatively, the processor 430 can be what is obtained by combining some of these with each other.

The main memory 432 corresponds to a main storage portion of the computer described above. The main memory 432 includes a nonvolatile memory area for storing the operating system or the application program, and a volatile memory area to be used as a work area where data is appropriately rewritten by the processor 430 similarly to the main memory 176 of the self-service POS terminal 1. The main memory 432 stores data which is necessary for the processor 430 to execute processing for controlling each unit in the nonvolatile memory area or the volatile memory area in some cases. The nonvolatile memory area is, for example, a ROM, and the volatile memory area is, for example, a RAM.

The auxiliary storage device 434 corresponds to an auxiliary storage portion of the computer described above. The auxiliary storage device 434 may be configured with, for example, an EEPROM, an HDD, or an SSD similarly to the auxiliary storage device 178 of the self-service POS terminal 1, and stores data to be used by the processor 430 when performing a variety of types of processing, data generated by the processing of the processor 430, and so on. It should be noted that the auxiliary storage device 434 stores the application program described above in some cases.

Also in the present second embodiment, the auxiliary storage device 434 may include a behavior order storage unit 440 and an article image storage unit 442. The behavior order storage unit 440 stores an order of the series of behaviors for the shopper to be required to perform with the information terminal 4. The article image storage unit 442 stores an appearance image of each of the articles to be sold in the store.

In the present embodiment, the series of behaviors stored by the behavior order storage unit 440 include, for example, a gripping behavior of the shopper picking up an article to be purchased, a scanning behavior of scanning the code symbol attached to an article with the scanner 422 in order to register the purchased article, and an input-to-basket behavior of inputting the scanned article into the shopping basket BA housed in the basket holder C3 of the shopping cart C, and the behavior order storage unit 440 stores the order of the behaviors in this order. The behavior order storage unit 440 is an example of a storage unit which stores the order of the plurality of behaviors to be performed when the shopper executes the registration of the purchased article The wireless unit 436 performs data communication in compliance with a communication protocol set in advance with an external device which is connected via a network by performing wireless communication with the access point 5. The external device is, for example, the store server 2.

The scanner 422 reads the code symbol from the article put over the reading window 426. The scanner 422 may be of a type which reads the code symbol by scanning with a laser beam, or of a type which reads the code symbol from an image taken by an imaging device.

The card reader 420 reads card data recorded on a card medium such as a credit card or a reward card.

Figure 10:
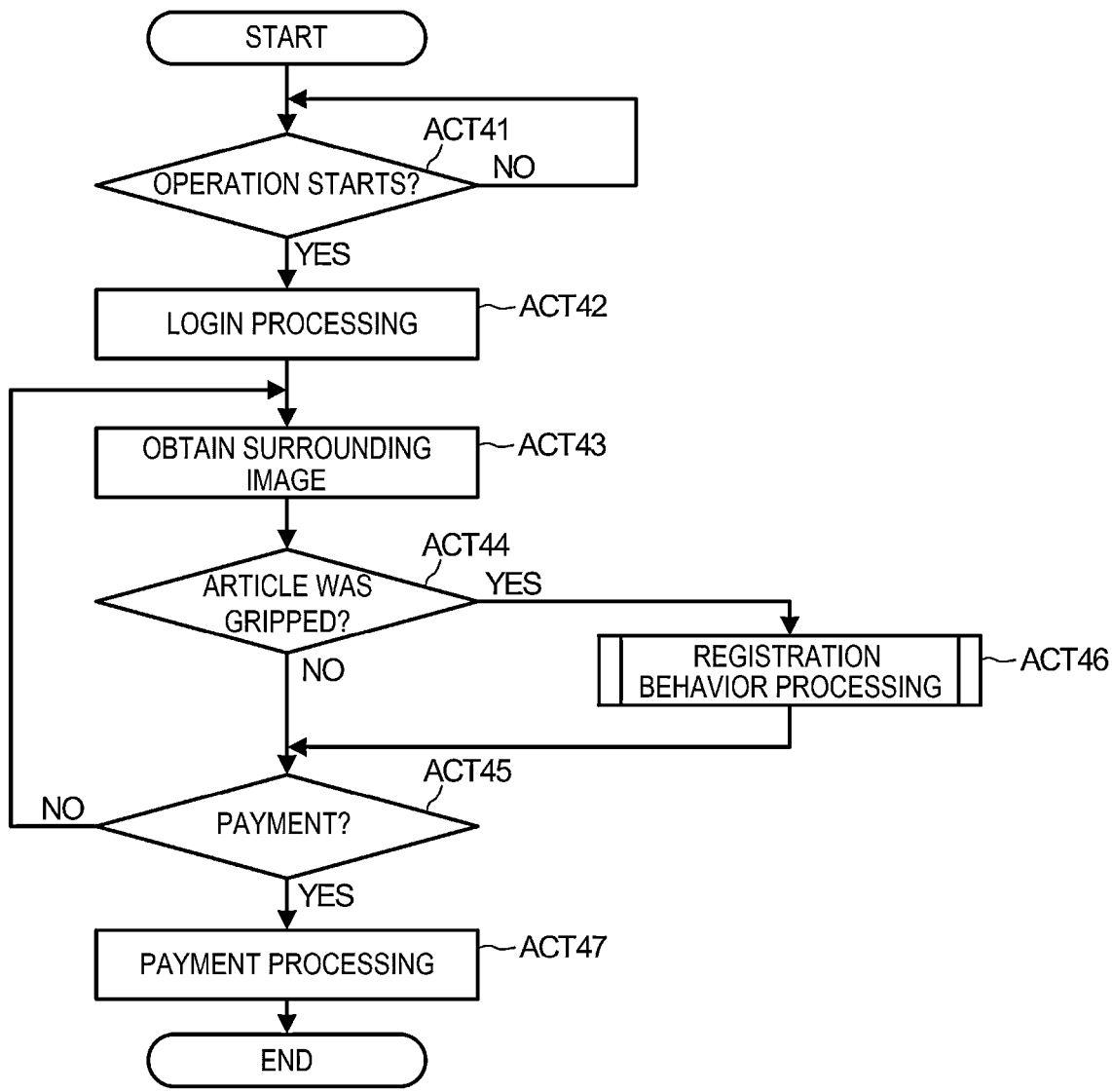
FIG. 10 is a flowchart representing an example of a procedure of an essential part of information processing to be executed by a processor of the information terminal.

The operation of the information terminal 4 having such a configuration will hereinafter be described. FIG. 10 is a flowchart representing an example of a procedure of an essential part of information processing to be executed by the processor 430 of the information terminal 4.

As ACT41, the processor 430 awaits a start of an operation by the shopper. For example, when the processor 430 starts the operation in response to power activation, the processor 174 displays "please touch" or the like on the display of the touch panel 416, and then gets into a standby state. In ACT41, whether the touch panel 416 was touched is determined. When a touch on the touch panel 416 by the shopper does not occur, the processor 430 determines NO in ACT41, and then repeats ACT41. When the touch panel 416 is touched by the shopper, the processor 430 determines YES in ACT41, and then proceeds to ACT42.

As ACT42, the processor 430 executes login processing. The login processing is processing of transmitting the member ID of the shopper read from the recording medium owned by the shopper with the card reader 420 to the store server 2 together with the terminal ID of that information terminal 4 with the wireless unit 436 via the access point 5 to get approval. The login processing is processing know to the public, and therefore, the detailed description thereof will be omitted. It should be noted that the store server 2 may generate a transaction file with respect to the member thus approved, update transaction data in the corresponding transaction file in accordance with the transmission of the article code attached with the terminal ID of the information terminal 4 from that information terminal 4, and transmit the transaction data to the payment machine 6 to make the payment machine 6 perform checkout when the shopper checks out on the payment machine 6.

Further, the processor 430 executes a behavior detection with respect to the gripping behavior of the shopper picking up an article to be purchased by the shopper, which is the first behavior in the series of behaviors stored in the behavior order storage unit 440.

Specifically, as ACT43, the processor 430 obtains a surrounding image with respect to the surrounding area taken by the surrounding area camera 412.

As ACT44, the processor 430 determines whether the shopper grips an article displayed on the article shelf based on the surrounding area image. Specifically, the processor 430 recognizes an area of a hand of the shopper from the surrounding area image to determine whether an object is gripped. The method of detecting the position of the hand is as described in the first embodiment. When no article is gripped, the processor 430 determines NO in ACT44, and then proceeds to ACT45. When an article is gripped, the processor 430 determines YES in ACT44, and then proceeds to ACT46. The processor 430 which executes the processing in ACT44 is an example of a behavior recognition unit for recognizing the behavior executed by the shopper, and at the same time, an example of a determination unit for determining the subsequent behavior as the behavior which the shopper should subsequently perform based on the behavior recognized by the behavior recognition unit.

As ACT45, the processor 430 determines whether a declaration for payment by the shopper was made. For example, a "payment" button to be used when the shopper declares the payment of the purchased article is displayed on the display of the touch panel 416, and the shopper touches the "payment" button when making the transition to the payment. Therefore, it is possible for the processor 430 to determine the presence or absence of the payment declaration based on whether the "payment" button is touched. When the declaration of payment was made, the processor 430 determines YES in ACT45, and then proceeds to ACT47. When the declaration of payment was not made, the processor 430 determines NO in ACT45, and then proceeds to ACT43.

Due to such a processing loop in ACT43 through ACT45 as described above, the processor 430 awaits gripping of an article or the payment declaration by the shopper. Then, when an article is gripped by the shopper, the processor 430 proceeds to ACT46.

As ACT46, the processor 430 executes registration behavior processing as a substance of the behavior detection with respect to the scanning behavior of scanning the code symbol attached to the article with the scanner 422 in order to perform the registration of the purchased article, and the input-to-basket behavior of inputting the article thus scanned into the shopping basket BA housed in the basket holder C3 of the shopping cart C.

Figure 11:
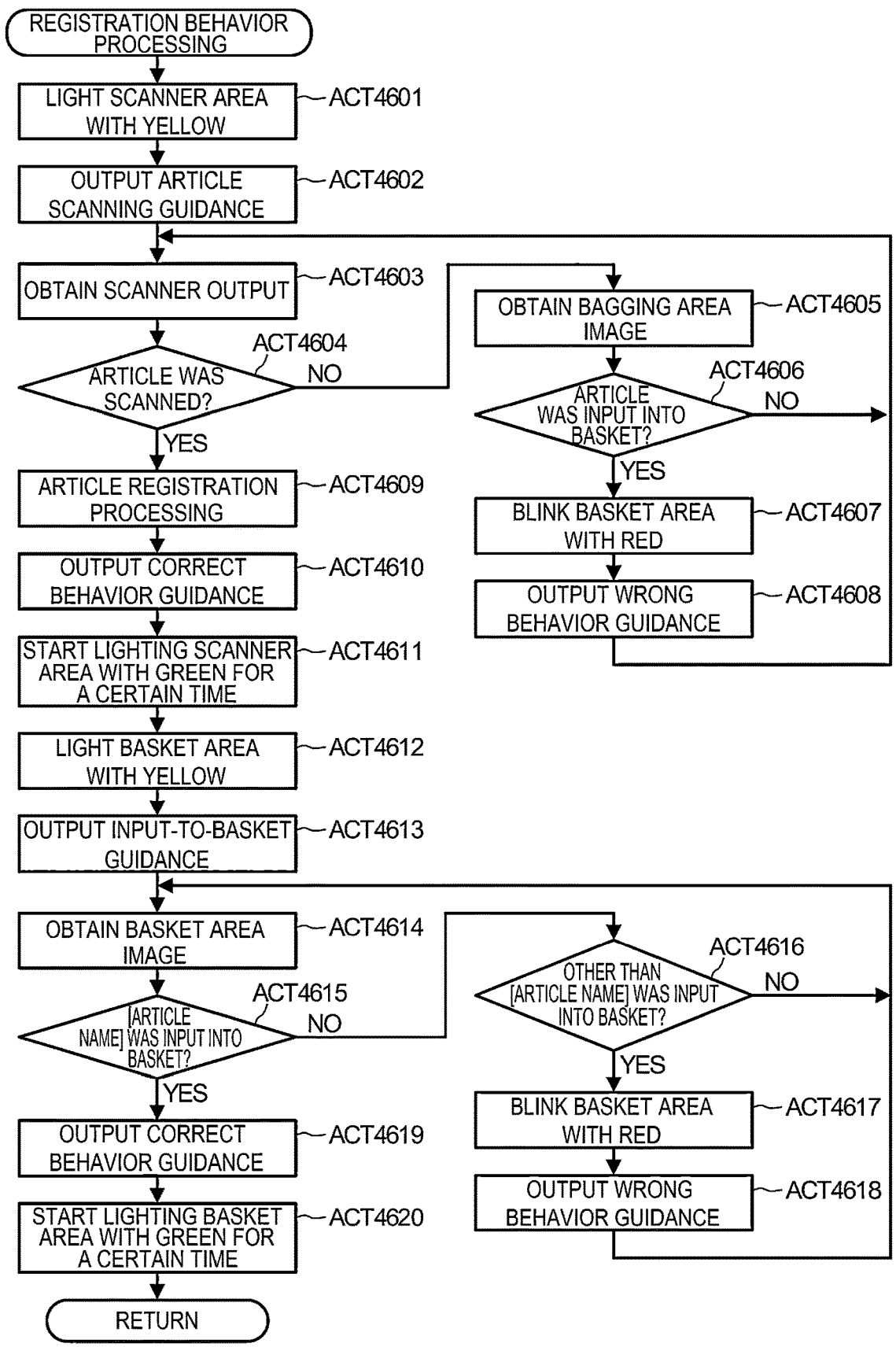
FIG. 11 is a flowchart showing an example of a detailed procedure of registration behavior processing in FIG. 10.

FIG. 11 is a flowchart showing an example of a detailed procedure of the registration behavior processing in ACT46. The processor 430 first executes the behavior detection with respect to the scanning behavior.

Specifically, first, as ACT4601, the processor 430 lights the scanner area LED frame 428 disposed on the periphery of the reading window 426 of the scanner 422 with the yellow color as the attention-seeking color. The processor 430 which executes the processing in ACT4601 is an example of the subsequent behavior annunciation unit which makes the annunciation member disposed so as to correspond to the behavior area where the subsequent behavior should be executed operate in the first annunciation configuration based on the subsequent behavior determined by the determination unit. The scanner area LED frame 428 is an example of the annunciation member disposed as to correspond to the behavior area in which the subsequent behavior should be executed. The lighting with the yellow color is an example of the operation in the first annunciation configuration.

As ACT4602, the processor 430 outputs article scanning guidance. For example, the processor 430 performs a guidance display of "please scan articles" on the display of the touch panel 416, and at the same time, outputs similar sound guidance from the speaker 418.

As ACT4603, the processor 430 obtains the output of the scanner 422.

As ACT4603, the processor 430 determines whether the article was scanned, namely whether the article code represented by the code symbol was obtained from the scanner 422. When the article was scanned, the processor 430 determines YES in ACT4604, and then proceeds to ACT4609. When the article was not scanned, the processor 430 determines NO in ACT4604, and then proceeds to ACT4605. The processor 430 which executes the processing in ACT4604 is an example of the behavior recognition unit for recognizing the behavior executed by the shopper, and at the same time, an example of the determination unit for determining the subsequent behavior as the behavior which the shopper should subsequently perform based on the behavior recognized by the behavior recognition unit.

As ACT4605, the processor 430 obtains the basket area image taken by the basket area camera 414.

As ACT4606, the processor 430 determines whether the article was input into the shopping basket BA based on the basket area image. Specifically, it is possible for the processor 430 to determine whether the article was input into the shopping basket BA by recognizing the area of the hand of the shopper from the basket area image to determine whether the hand entered the basket area. When the article was not input into the shopping basket BA, the processor 430 determines NO in ACT4606, and then proceeds to ACT4603. The processor 430 which executes the processing in ACT4606 is an example of the behavior recognition unit for recognizing the behavior executed by the shopper.

Due to such a processing loop in ACT4603 through ACT4606 as described above, the processor 430 gets into a standby state for scanning of articles.

When the article which was not scanned is input into the shopping basket BA during the standby state for scanning of articles, the processor 430 determines YES in ACT4606, and proceeds to ACT4607. As ACT4607, the processor 430 blinks the basket area LED frame 424 with the red color as the warning color. The processor 430 which executes the processing in ACT4607 is an example of the warning unit which makes the annunciation member disposed so as to correspond to the behavior area where a different behavior from the subsequent behavior is executed operate in the warning configuration different from the first and second annunciation configurations when the behavior recognition unit recognized that the shopper executed the different behavior. The blinking with the red color is an example of the operation in the warning configuration.

As ACT4608, the processor 430 outputs the wrong behavior guidance. For example, the processor 430 outputs a warning voice such as "please scan the article before inputting the article into the basket" from the speaker 418, and at the same time, displays a similar warning message on the display of the touch panel 416 for a predetermined period of time. Subsequently, the processor 430 makes the transition to the processing in ACT4603.

When the article was scanned during the standby state for scanning of articles in the processing loop in ACT4603 through ACT4606, the processor 430 determines YES in ACT4604, and proceeds to ACT4609. As ACT4609, the processor 430 executes the article registration processing with the article code of the article thus obtained. In the article registration processing, as described above, the processor 430 transmits the article code thus obtained to the store server 2 with the wireless unit 436 via the access point 5.

As ACT4610, the processor 430 outputs the correct behavior guidance. For example, the processor 430 outputs the sound effect representing the correct answer such as "ding-dong" from the speaker 418.

As ACT4611, the processor 430 starts lighting the scanner area LED frame 428 which was lit with the yellow color in ACT4601, with the green color for a certain period of time. This certain period of time is not exactly regulated, and is sufficiently a time necessary for the shopper to start inputting the article which was scanned into the shopping basket BA. The certain period of time is, for example, about 1 second. The processor 430 which executes the processing in ACT4611 is an example of the correct behavior annunciation unit which makes the annunciation member operating in the first annunciation configuration operate in the second annunciation configuration different from the first annunciation configuration when the behavior recognition unit recognized that the shopper executed the subsequent behavior. The lighting with the green color for the certain period of time is an example of the operation in the second annunciation configuration.

Then, the processor 430 executes the behavior detection with respect to the input-to-basket behavior. Specifically, first, as ACT4612, the processor 430 lights the basket area LED frame 424 with the yellow color as the attention-seeking color. The processor 430 which executes the processing in ACT4612 is an example of the subsequent behavior annunciation unit which makes the annunciation member disposed so as to correspond to the behavior area where the subsequent behavior should be executed operate in the first annunciation configuration based on the subsequent behavior determined by the determination unit. The basket area LED frame 424 is an example of the annunciation member disposed so as to correspond to the behavior area in which the subsequent behavior should be executed. The lighting with the yellow color is an example of the operation in the first annunciation configuration.

As ACT4613, the processor 430 outputs the input-to-basket guidance. For example, the processor 430 performs a guidance display of "please input [article name] into the basket" on the display of the touch panel 416, and at the same time, outputs similar sound guidance from the speaker 418. Here, [article name] is the article name of the article corresponding to the article code registered in ACT4609.

As ACT4614, the processor 430 obtains the basket area image taken by the basket area camera 414.

As ACT4615, the processor 430 determines whether the article named [article mane] was input into the shopping basket BA based on the basket area image. Specifically, the processor 430 recognizes an area of the hand of the shopper from the basket area image to determine whether the hand entered the basket area. The method of detecting the position of the hand is as described in ACT44. Further, the processor 430 applies a known technique such as template matching to the image of the periphery of the hand to thereby determine whether the image of the article gripped by the hand coincides with the image of the article named [article name]. It should be noted that the images of the articles are stored in the article image storing unit 442 of the auxiliary storage device 434. In this way, it is possible for the processor 430 to determine the input of the article named [article name] into the shopping basket BA. When the article named [article name] was input into the shopping basket BA, the processor 430 determines YES in ACT4615, and then proceeds to ACT4619. When the article named [article name] is not input into the shopping basket BA, the processor 430 determines NO in ACT4615, and then proceeds to ACT4616. The processor 430 which executes the processing in ACT4615 is an example of the behavior recognition unit for recognizing the behavior executed by the shopper, and at the same time, an example of the determination unit for determining the subsequent behavior as the behavior which the shopper should subsequently perform based on the behavior recognized by the behavior recognition unit.

As ACT4616, the processor 430 determines whether other articles than [article name] were input into the shopping basket BA. When other articles than the article named [article name] are also not input into the shopping basket BA, the processor 430 determines NO in ACT4616, and then proceeds to ACT4614. The processor 430 which executes the processing in ACT4616 is an example of the behavior recognition unit for recognizing the behavior executed by the shopper.

Due to such a processing loop in ACT4614 through ACT4616 as described above, the processor 430 gets into a standby state for the input of the article named [article name] into the shopping basket BA. It should be noted that as long as it is until the certain period of time described above elapses, the green lighting of the scanner area LED frame 428 continues in some cases during the standby state for inputting the article into the basket.

When an article other than the article named [article name] is input into the shopping basket BA during the standby state for inputting the article named [article mane] into the basket, the processor 430 determines YES in ACT4616, and proceeds to ACT4617. As ACT4617, the processor 430 blinks the basket area LED frame 424 with the red color as the warning color. The processor 430 which executes the processing in ACT4617 is an example of the warning unit which makes the annunciation member disposed so as to correspond to the behavior area where a different behavior from the subsequent behavior is executed operate in the warning configuration different from the first and second annunciation configurations when the behavior recognition unit recognized that the shopper executed the different behavior. The blinking with the red color is an example of the operation in the warning configuration.

As ACT4618, the processor 430 outputs the wrong behavior guidance. For example, the processor 430 outputs a warning voice such as "please input the scanned article into the basket" from the speaker 418, and at the same time, displays a similar warning message on the display of the touch panel 416 for a predetermined period of time. Subsequently, the processor 430 makes the transition to the processing in ACT4614.

As ACT4619, the processor 430 outputs the correct behavior guidance. For example, the processor 430 outputs the sound effect representing the correct answer such as "ding-dong" from the speaker 418.

As ACT4620, the processor 430 starts lighting the basket area LED frame 424 which was lit with the yellow color in ACT4612 with the green color for a certain period of time. The certain period of time is not exactly regulated, but can be set to, for example, about 1 second similarly to other certain period of time. Subsequently, the processor 430 returns to the higher-level routine. The processor 430 which executes the processing in ACT4620 is an example of the correct behavior annunciation unit which makes the annunciation member operating in the first annunciation configuration operate in the second annunciation configuration different from the first annunciation configuration when the behavior recognition unit recognized that the shopper executed the subsequent behavior. The lighting with the green color for the certain period of time is an example of the operation in the second annunciation configuration.

It should be noted that ACT4611 and ACT4620 may be the same in certain period of time as each other, or may be different in certain period of time from each other.

Referring back to the description of FIG. 10, when the processing of the scanning behavior and the input-to-basket behavior with respect to one article in the shopping basket as the registration behavior processing in ACT46 is completed, the processor 430 proceeds to ACT15. In this way, during the processing loop in ACT43 through ACT46, the registration of the articles and the input of the articles into the shopping basket BA by the shopper are executed as a result. Then, when the payment is declared by the shopper, the processor 430 determines YES in ACT45, and then proceeds to ACT47.

As ACT47, the processor 430 executes the payment processing. In this payment processing, for example, the processor 430 transmits a payment command including the terminal ID of that information terminal 4 to the store server 2 with the wireless unit 436 via the access point 5. In the store server 2, a unique payment code is issued in response to the reception of this payment command, and then, sends back a barcode image representing the payment code to that information terminal 4. The shopper makes the display of the touch panel 416 display this barcode image to allow the scanner provided to the payment machine 6 to read the barcode image. Thus, it is possible for the payment machine 6 to obtain the payment code, and obtain the transaction data corresponding to the payment code from the store server 2, and thus executes the checkout processing.

As described above, it is possible to adopt the computer including the processor 430 of the information terminal 4 as the control device. Therefore, according also to the present second embodiment, substantially the same advantages as those of the first embodiment can be obtained.

It should be noted that although the description is presented citing the information terminal 4 attached to the shopping cart C as an example, it is possible to adopt a smartphone owned by the shopper as the control device of the information terminal 4. In this case, an application program for executing the function as the control device according to the present embodiment is installed in the smartphone. The shopper uses the shopping cart C provided with the basket area LED frame 424. Scanning of an article is executed using a camera provided to the smartphone, and it is possible to use the sales floor monitoring cameras 7 as the cameras to be used for the behavior recognition of the shopper. The smartphone obtains the sales floor image from the sales floor monitoring camera 7 corresponding to the position where that smartphone is located via the access point 5, and extracts an area image as a pixel portion of the area where the behavior detection should be performed as the subsequent behavior from the sales floor image thus obtained. It is possible to extract the area image based on the position of the hand of the shopper in the sales floor layout or the position of the hand with respect to each unit of the shopping cart C detected in real time using a technique of an object detection such as SSD. Since the smartphone does not have the scanner area LED frame 428, it is assumed that a scan message, an image showing the condition of performing scanning, or the like is displayed on the display. When performing the display, the color, the display pattern, or the color and the display pattern can be changed in accordance with whether the behavior is correct or wrong.

Third Embodiment

Then, a third embodiment will be described. It should be noted that the configurations and operations substantially the same as those in the first embodiment will be attached with substantially the same reference symbols as in the first embodiment to thereby omit the description thereof.

In the first and second embodiments described above, there are respectively described the behavior guide systems in which the annunciation members and the control device are provided to the self-service POS terminal 1 and the information terminal 4, but it is possible to adopt a behavior guide system in which the annunciation members and the control device are provided to respective devices separated from each other.

Figure 12:
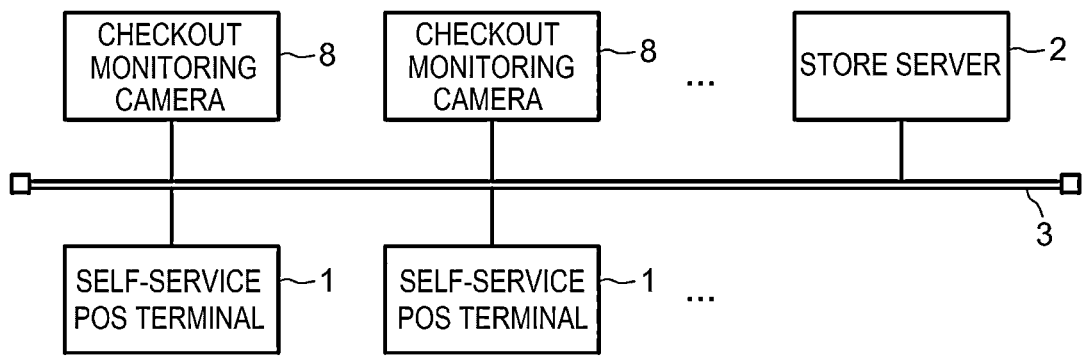
FIG. 12 is a schematic configuration diagram showing a settlement system of a self-service type as a behavior guide system according to a third embodiment including a control device according to the third embodiment.

FIG. 12 is a schematic configuration diagram showing a self-service type settlement system as a behavior guide system according to the third embodiment including the store server 2 as the control device according to the third embodiment. The settlement system according to the present embodiment includes a plurality of checkout monitoring cameras 8 in addition to the plurality of self-service POS terminals 1 and the store server 2.

Figure 13:
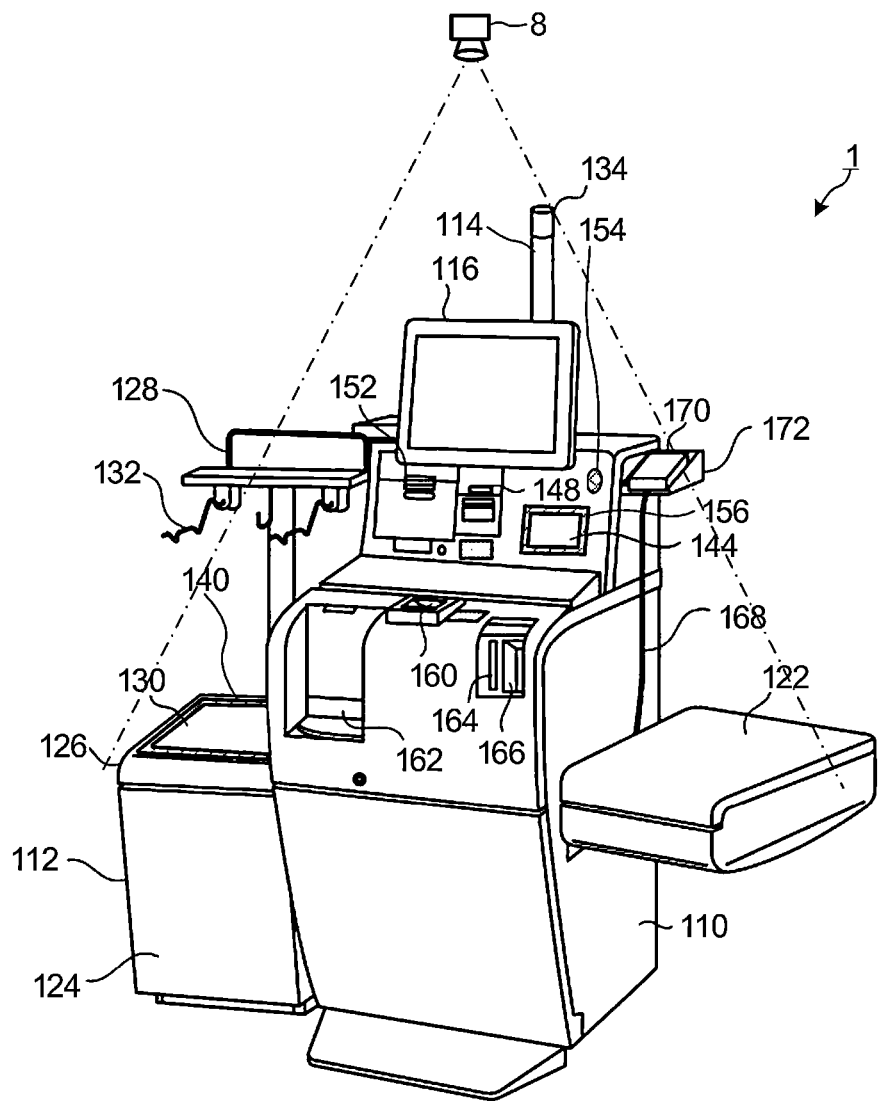
FIG. 13 is a perspective view showing an example of an imaging range of a checkout monitoring camera in FIG. 12.

FIG. 13 is a perspective view showing an example of an imaging range of the checkout monitoring camera 8. The checkout monitoring cameras 8 are disposed so as to correspond one-to-one to the self-service POS terminals 1, and are installed on the ceiling or the like above the self-service POS terminals 1, respectively. The mounting position and the posture of the checkout monitoring camera 8 are set so that the field angle, namely the imaging area, includes the basket area and the bagging area in the first embodiment as indicated by the dashed-dotted lines in FIG. 13.

The self-service POS terminal 1 in the present embodiment is not provided with the basket area camera 136 and the bagging area camera 138, but the bagging area LED frame 140 and the scanner area LED frame 156 as the annunciation members are disposed similarly to the first embodiment.

Figure 14:
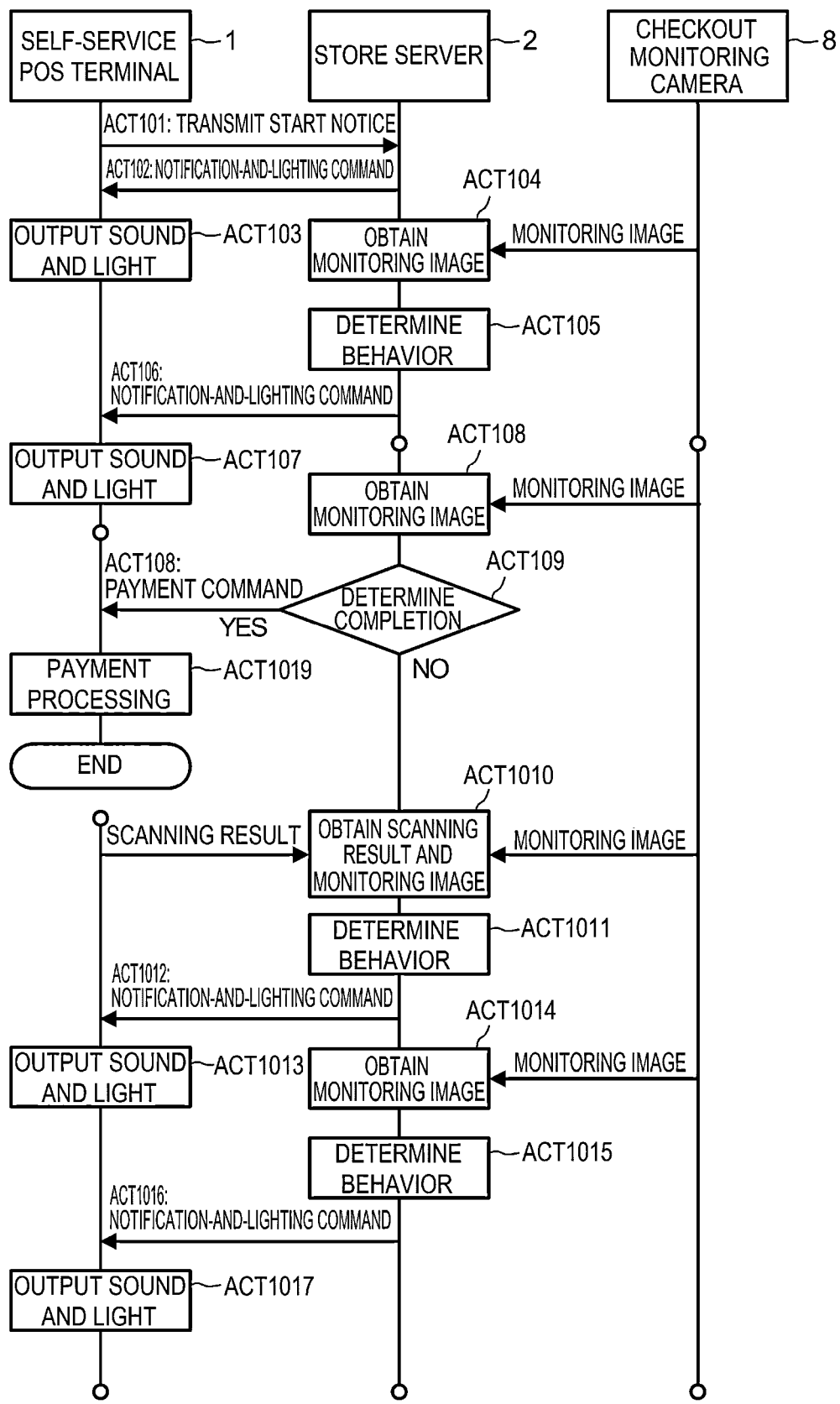
FIG. 14 is a sequence diagram illustrating an operation of the settlement system.

FIG. 14 is a sequence diagram illustrating an operation of such a settlement system.

When the operation is started by the shopper and the bag selection is performed as in ACT11 and ACT12 described in the first embodiment, the self-service POS terminal 1 transmits (ACT101) a start notice to the store server 2.

The store server 2 determines the subsequent behavior as the behavior which the shopper should subsequently perform in response to the start notice, and then transmit (ACT102) a notification-and-lighting command to the self-service POS terminal 1 based on the subsequent behavior thus determined. It should be noted that the operations performed by the store server 2 in this sequence chart are executed by a processor provided to the store server 2 in reality, but there is simply described here that the operations are performed by the store server 2. The notification-and-lighting command may be, for example, a command of lighting the bagging area LED frame 140 of the self-service POS terminal 1 with the yellow color as the attention-seeking color, and a command of making the display of the touch panel 116 perform the guidance display of "please set a bag," and at the same time, outputting similar sound guidance from the speaker 154. Therefore, the store server 2 is an example of the behavior recognition unit for recognizing the behavior executed by the shopper, and at the same time, an example of the determination unit for determining the subsequent behavior as the behavior which the shopper should subsequently perform based on the behavior recognized by the behavior recognition unit. Further, the store server 2 is an example of the subsequent behavior annunciation unit which makes the annunciation member disposed so as to correspond to the behavior area where the subsequent behavior should be executed operate in the first annunciation configuration based on the subsequent behavior determined by the determination unit.

In response to the notification-and-lighting command from the store server 2, the processor 174 of the self-service POS terminal 1 lights the bagging area LED frame 140 with the yellow color as the attention-seeking color, performs the guidance display on the display of the touch panel 116, and at the same time, outputs the sound guidance from the speaker 154 as in ACT13 and ACT14 in the first embodiment (ACT103). The bagging area LED frame 140 is an example of the annunciation member disposed so as to correspond to the behavior area in which the subsequent behavior should be executed. The lighting with the yellow color is an example of the operation in the first annunciation configuration.

Further, the store server 2 obtains (ACT104) a monitoring image taken by the checkout monitoring camera 8 corresponding to the self-service POS terminal 1.

Then, the store server 2 determines (ACT105) the behavior of the shopper based on the monitoring image. Specifically, the store server 2 first extracts an area image as the pixel portion of an area where the behavior detection as the subsequent behavior should be performed from the monitoring image thus obtained. For example, when the subsequent behavior is a behavior related to the bag setting behavior of setting a bag such as the plastic store bag or the own-bag to the weighing unit 112, the store server 2 extracts the pixel portion corresponding to such a bagging area as described in the first embodiment as the bagging area image from the monitoring image. This is an operation corresponding to ACT15 in the first embodiment. Then, the store server 2 recognizes the behavior which the shopper currently executes based on the bagging area image thus extracted. The specific method of the recognition is as described in the first embodiment. Therefore, the store server 2 is an example of the behavior recognition unit for recognizing the behavior executed by the shopper. Then, the store server 2 determines whether the behavior of setting a bag was performed. This is an operation corresponding to ACT16 in the first embodiment.

When the behavior of setting a bag was performed, the store server 2 transmits (ACT106) the notification-and-lighting command to the self-service POS terminal 1. This notification-and-lighting command may be, for example, a command of lighting the bagging area LED frame 140 of the self-service POS terminal 1 with the green color for a certain period of time, and a command of outputting a sound effect representing a correct answer such as "ding-dong" from the speaker 154. Therefore, the store server 2 is an example of the correct behavior annunciation unit which makes the annunciation member operating in the first annunciation configuration operate in the second annunciation configuration different from the first annunciation configuration when the behavior recognition unit recognized that the shopper executed the subsequent behavior. Further, as the notification-and-lighting command, it is possible to continue a command of lighting the scanner area LED frame 156 arranged on the periphery of the reading window 144 of the scanner 142 of the self-service POS terminal 1 with the yellow color as the attention-seeking color, and a command of making the display of the touch panel 116 perform the guidance display of "please scan the article," and at the same time, outputting similar sound guidance from the speaker 154. Therefore, the store server 2 is an example of the subsequent behavior annunciation unit which makes the annunciation member disposed so as to correspond to the behavior area where the subsequent behavior should be executed operate in the first annunciation configuration based on the subsequent behavior determined by the determination unit.

In response to the notification-and-lighting command from the store server 2, the processor 174 of the self-service POS terminal 1 starts lighting the bagging area LED frame 140 with the green color for a certain period of time, and at the same time, outputs the sound effect representing a correct answer from the speaker 154 as in ACT17 and ACT18 in the first embodiment (ACT107). The lighting with the green color for the certain period of time is an example of the operation in the second annunciation configuration. Further, the processor 174 of the self-service POS terminal 1 lights the scanner area LED frame 156 with the yellow color as the attention-seeking color, performs the guidance display on the display of the touch panel 116, and at the same time, outputs the sound guidance from the speaker 154 as in ACT2101 and ACT2102 in the first embodiment. The scanner area LED frame 156 is an example of the annunciation member disposed so as to correspond to the behavior area in which the subsequent behavior should be executed. The lighting with the yellow color is an example of the operation in the first annunciation configuration.

Then, the store server 2 obtains (ACT108) the monitoring image taken by the checkout monitoring camera 8 corresponding to the self-service POS terminal 1.

Then, the store server 2 makes the completion determination, namely determines whether the content of the shopping basket is empty (ACT109). Specifically, the pixel portion corresponding to such a basket area as described in the first embodiment is extracted as the basket area image from the monitoring image thus obtained. This is an operation corresponding to ACT19 in the first embodiment. Then, the store server 2 determines whether the content of the shopping basket is empty from the basket area image thus extracted using a known image recognition processing technique. This is an operation corresponding to ACT20 in the first embodiment. Therefore, the store server 2 is an example of the behavior recognition unit for recognizing the behavior executed by the shopper, and at the same time, an example of the determination unit for determining the subsequent behavior as the behavior which the shopper should subsequently perform based on the behavior recognized by the behavior recognition unit.

When the content of the shopping basket is not empty, the store server 2 obtains (ACT1010) the scanning result of the scanner 142 from the self-service POS terminal 1. This is an operation corresponding to ACT2103 in the first embodiment. Further, the store server 2 obtains the monitoring image taken by the checkout monitoring camera 8 corresponding to the self-service POS terminal 1.

Then, the store server 2 determines (ACT1011) the behavior of the shopper based on the scanning result and the monitoring image. Specifically, the store server 2 determines whether the article scan was performed based on the scanning result thus obtained. This is an operation corresponding to ACT2104 in the first embodiment. Further, the store server 2 extracts the pixel portion corresponding to such a bagging area as described in the first embodiment as the bagging area image from the monitoring image thus obtained, and then determines whether the article was bagged based on the bagging area image. This is an operation corresponding to ACT2104 and ACT2105 in the first embodiment. Therefore, the store server 2 is an example of the behavior recognition unit for recognizing the behavior executed by the shopper, and at the same time, an example of the determination unit for determining the subsequent behavior as the behavior which the shopper should subsequently perform based on the behavior recognized by the behavior recognition unit.

When the behavior of scanning the article was performed, or when the behavior of bagging the article was performed, the store server 2 transmits (ACT1012) the notification-and-lighting command to the self-service POS terminal 1.

When the article scan was performed, this notification-and-lighting command may be a command of lighting the bagging area LED frame 140 of the self-service POS terminal 1 with the green color for a certain period of time, and a command of outputting a sound effect representing a correct answer such as "ding-dong" from the speaker 154. Therefore, the store server 2 is an example of the correct behavior annunciation unit which makes the annunciation member operating in the first annunciation configuration operate in the second annunciation configuration different from the first annunciation configuration when the behavior recognition unit recognized that the shopper executed the subsequent behavior. Further, as the notification-and-lighting command, it is possible to continue a command of lighting the bagging area LED frame 140 of the self-service POS terminal 1 with the yellow color as the attention-seeking color, and a command of making the display of the touch panel 116 perform the guidance display of "please bag [article name]," and at the same time, outputting similar sound guidance from the speaker 154. Therefore, the store server 2 is an example of the subsequent behavior annunciation unit which makes the annunciation member disposed so as to correspond to the behavior area where the subsequent behavior should be executed operate in the first annunciation configuration based on the subsequent behavior determined by the determination unit.

Further, when an article which was not scanned was bagged, the notification-and-lighting command may be a command of blinking the bagging area LED frame 140 of the self-service POS terminal 1 with the red color as the warning color, and a command of outputting a warning voice such as "please scan the article before bagging" from the speaker 154, and at the same time, displaying a similar warning message on the display of the touch panel 116 for a predetermined period of time. Therefore, the store server 2 is an example of the warning unit which makes the annunciation member disposed so as to correspond to the behavior area where a different behavior from the subsequent behavior is executed operate in the warning configuration different from the first and second annunciation configurations when the behavior recognition unit recognized that the shopper executed the different behavior. The blinking with the red color is an example of the operation in the warning configuration.

In response to the notification-and-lighting command from the store server 2, the processor 174 of the self-service POS terminal 1 performs (ACT1013) the sound output and the lighting based on the command.

Specifically, the processor 174 starts lighting the scanner area LED frame 156 with the green color for a certain period of time, and then outputs the sound effect representing a correct answer from the speaker 154 as in ACT2110 and ACT2111 in the first embodiment. The lighting with the green color for the certain period of time is an example of the operation in the second annunciation configuration. Further, the processor 174 lights the bagging area LED frame 140 with the yellow color as the attention-seeking color, performs the guidance display on the display of the touch panel 116, and at the same time, outputs the sound guidance from the speaker 154 as in ACT2112 and ACT2123 in the first embodiment. The bagging area LED frame 140 is an example of the annunciation member disposed so as to correspond to the behavior area in which the subsequent behavior should be executed. The lighting with the yellow color is an example of the operation in the first annunciation configuration.

Alternatively, the processor 174 blinks the bagging area LED frame 140 with the red color as the warning color, outputs the warning voice from the speaker 154, and at the same time, displays a similar warning message on the display of the touch panel 116 for a predetermined period of time as in ACT2107 and ACT2108 in the first embodiment. The blinking with the red color is an example of the operation in the warning configuration.

Further, when the article scan was performed, the store server 2 obtains (ACT1014) the monitoring image taken by the checkout monitoring camera 8 corresponding to the self-service POS terminal 1.

Then, the store server 2 determines (ACT1015) the behavior of the shopper based on the monitoring image. Specifically, the store server 2 extracts the pixel portion corresponding to such a bagging area as described in the first embodiment as the bagging area image from the monitoring image thus obtained, and then determines whether the article named [article name] or an article other than the article named [article mane] was bagged based on the bagging area image. This is an operation corresponding to ACT2114, ACT2115, and ACT2116 in the first embodiment. Therefore, the store server 2 is an example of the behavior recognition unit for recognizing the behavior executed by the shopper, and at the same time, an example of the determination unit for determining the subsequent behavior as the behavior which the shopper should subsequently perform based on the behavior recognized by the behavior recognition unit.

When the behavior of bagging any of the articles was performed, the store server 2 transmits (ACT1016) the notification-and-lighting command to the self-service POS terminal 1. Subsequently, the store server 2 proceeds to the operation in ACT108.

When the article scan of [article name] was performed, this notification-and-lighting command may be a command of lighting the bagging area LED frame 140 of the self-service POS terminal 1 with the green color for a certain period of time, and a command of outputting a sound effect representing a correct answer such as "ding-dong" from the speaker 154. Therefore, the store server 2 is an example of the correct behavior annunciation unit which makes the annunciation member operating in the first annunciation configuration operate in the second annunciation configuration different from the first annunciation configuration when the behavior recognition unit recognized that the shopper executed the subsequent behavior. Further, as the notification-and-lighting command, it is possible to continue a command of lighting the scanner area LED frame 156 of the self-service POS terminal 1 with the yellow color as the attention-seeking color, and a command of making the display of the touch panel 116 perform the guidance display of "please scan the article," and at the same time, outputting similar sound guidance from the speaker 154. Therefore, the store server 2 is an example of the subsequent behavior annunciation unit which makes the annunciation member disposed so as to correspond to the behavior area where the subsequent behavior should be executed operate in the first annunciation configuration based on the subsequent behavior determined by the determination unit.

Further, when the article scan other than [article name] was performed, the notification-and-lighting command may be a command of blinking the bagging area LED frame 140 of the self-service POS terminal 1 with the red color as the warning color, and a command of outputting a warning voice such as "please bag the scanned article" from the speaker 154, and at the same time, displaying a similar warning message on the display of the touch panel 116 for a predetermined period of time. Therefore, the store server 2 is an example of the warning unit which makes the annunciation member disposed so as to correspond to the behavior area where a different behavior from the subsequent behavior is executed operate in the warning configuration different from the first and second annunciation configurations when the behavior recognition unit recognized that the shopper executed the different behavior. The blinking with the red color is an example of the operation in the warning configuration.

In response to the notification-and-lighting command from the store server 2, the processor 174 of the self-service POS terminal 1 performs (ACT1017) the sound output and the lighting based on the command.

Specifically, the processor 174 starts lighting the bagging area LED frame 140 with the green color for a certain period of time, and then outputs the sound effect representing a correct answer from the speaker 154 as in ACT2119 and ACT2120 in the first embodiment. The lighting with the green color for the certain period of time is an example of the operation in the second annunciation configuration. Further, the processor 174 lights the scanner area LED frame 156 with the yellow color as the attention-seeking color, performs the guidance display on the display of the touch panel 116, and at the same time, outputs the sound guidance from the speaker 154 as in ACT2101 and ACT2102 in the first embodiment. The scanner area LED frame 156 is an example of the annunciation member disposed so as to correspond to the behavior area in which the subsequent behavior should be executed. The lighting with the yellow color is an example of the operation in the first annunciation configuration.

Alternatively, the processor 174 blinks the bagging area LED frame 140 with the red color as the warning color, outputs the warning voice from the speaker 154, and at the same time, displays a similar warning message on the display of the touch panel 116 for a predetermined period of time as in ACT2117 and ACT2118 in the first embodiment. The blinking with the red color is an example of the operation in the warning configuration.

Further, in ACT109, when termination is determined, namely it is determined that the content of the shopping basket is empty, the store server 2 transmits (ACT1018) a payment command to the self-service POS terminal 1.

In response to the payment command from the store server 2, the processor 174 of the self-service POS terminal 1 executes (ACT1019) the payment processing based on the article sales data stored in the transaction file 186.

As described above, it is possible to use the store server 2 as the control device. Therefore, according also to the present third embodiment, substantially the same advantages as those of the first embodiment can be obtained.

It should be noted that the above description is presented using an example corresponding to the first embodiment, but it is obvious that the present embodiment can be made to correspond also to the second embodiment.

Further, there is described the example in which the store server 2 acts as the control device, but it is obvious that it is possible for the management server disposed on the cloud outside the store to act as the control device.

Fourth Embodiment

The behavior guide system corresponding to the series of behaviors to be executed by the shopper is described as the first through third embodiments, but the present disclosure can also be applied to behaviors other than shopping. Further, it is assumed that what behavior was performed is recognized based on the images taken by the camera, but it is possible to execute the behavior detection using a sensor other than the camera.

For example, as a behavior regarded as important on the grounds of the recent spread of infection, there can be cited a hand-wash behavior.

Figure 15:
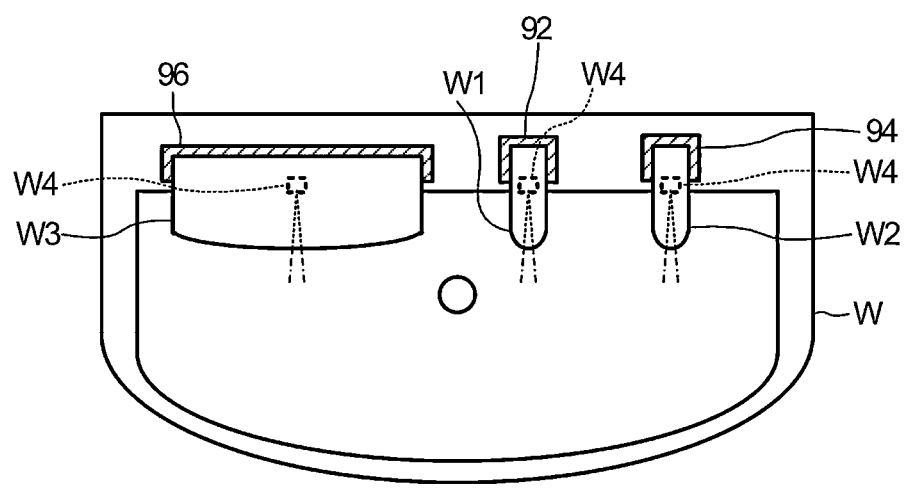
FIG. 15 is a plan view showing an example of an appearance configuration of a hand-wash unit to which a behavior guide system according to a fourth embodiment including a control device according to the fourth embodiment is applied.

FIG. 15 is a plan view showing an example of an appearance configuration of a hand-wash system to which a behavior guide system according to the fourth embodiment including a control device according to the fourth embodiment is applied. The hand-wash unit includes a wash-hand basin W. The wash-hand basin W is provided with an automatic water faucet W1 from which water is discharged, an automatic soap faucet W2 from which soapy water is discharged, and an automatic blower faucet W3 from which warm air blows off, and object detection sensors W4 for detecting that a hand is located at a predetermined position are disposed in order to make the respective faucets operate.

In the present embodiment, a water area LED frame 92 is disposed at the root of the automatic water faucet W1 in the wash-hand basin W, a soap area LED frame 94 is similarly disposed at the root of the automatic soap faucet W2, and a blower area LED frame 96 is similarly disposed at the root of the automatic blower faucet W3.

Further, a control device not shown defines a wash-with-water behavior, a wash-with-soap behavior, and a blower behavior as a series of hand-wash behavior, stores an order of the wash-with-water behavior and the wash-with-soap behavior including the number of times and durations thereof, and appropriately lights the LED frames 92, 94, and 96.

In the first through third embodiments, it is possible to use a detection result of the hand of the shopper with a sensor such as the object detection sensor W4 when recognizing any of the behaviors.

Other Embodiments

The embodiments of the control device are hereinabove described, but the embodiments are not limited thereto.

For example, the light emitting members which function as the annunciation members are not required to be formed to have the frame shape surrounding the behavior area. For example, it is possible to dispose the green LED, the yellow LED, and the red LED one by one at any one of the places in the behavior area.

Further, the annunciation member is not limited to the light emitting member, and can also be a projection device for projecting a spot light, or can also be a message or an image to be displayed on the display of the touch panel 116, 416.

The scanner 142, 422 is not limited to what scans the code symbol attached to the article to output the article code, and can be a camera for imaging an appearance of the article, and it is possible to arrange that the processor 174, 430 identifies the article from the article image using a pattern matching technique. In this case, the scanning behavior described in the embodiments is replaced with an imaging behavior.

Further, it is assumed in the first embodiment that the bagging area camera 138 is installed so that the placement surface 130 is included in the field angle, namely the imaging area, thereof, but it is possible to install that camera so that a wider range shows up. In this case, as described in the second embodiment, by extracting the pixel portion corresponding to the bagging area from the taken image of the bagging area camera 138, it is possible to obtain the bagging area image.

Further, the flow of the information processing described above to be performed by the processors 174, 430 is illustrative only, and is not limited to this order. For example, it is possible to exchange the order of ACT13 and ACT14 in the flowchart in FIG. 4, or can also perform ACT13 and ACT14 in parallel to each other. As described above, as long as no conflict with preceding or following processing occurs, it is possible to modify the order of the processing or to perform a plurality of types of processing in parallel to each other.

In addition, although some embodiments of the present disclosure are described, these embodiments are illustrative only, and it is not intended to limit the scope of the present disclosure. These novel embodiments can be implemented with other various aspects, and a variety of omissions, replacements, and modifications can be made within the scope or the spirit of the present disclosure. These embodiments and modifications thereof are included in the scope of the present disclosure, and at the same time, included in the present disclosure set forth in the appended claims, and the equivalents thereof.

What is claimed is:

1. A control device configured to control annunciation members disposed so as to correspond respectively to a plurality of behavior areas where a plurality of behaviors included in a series of behaviors to be executed by a shopper is executed, the control device comprising:
    a behavior recognition component configured to recognize a behavior of the plurality of behaviors executed by the shopper;
    a determination component configured to determine a subsequent behavior of the plurality of behaviors as a behavior for the shopper to subsequently perform based on the behavior recognized by the behavior recognition component;
    a subsequent behavior annunciation component configured to make an annunciation member disposed so as to correspond to a behavior area where the subsequent behavior is to be executed operate in a first annunciation configuration based on the subsequent behavior determined by the determination component;
    a correct behavior annunciation component configured to make the annunciation member, which operates in the first annunciation configuration, operate in a second annunciation configuration different from the first annunciation configuration when the behavior recognition component recognizes that the shopper executes the subsequent behavior; and
    a warning component configured to make the annunciation member, which is disposed so as to correspond to the behavior area where a different behavior from the subsequent behavior is executed, operate in a warning configuration different from the first annunciation configuration and the second annunciation configuration when the behavior recognition component recognizes that the shopper executes the different behavior,
    wherein the plurality of behaviors include a scanning behavior of scanning a code symbol attached to a purchased article with a scanner and a behavior to place a scanned article on a predetermined area.

2. The control device according to claim 1, wherein
the series of behaviors to be executed by the shopper include a plurality of behaviors to be performed by the shopper when executing registration of the purchased article,
the control device further includes a storage component configured to store an order of the plurality of behaviors to be performed when executing the registration of the purchased article, and
the determination component is further configured to determine the subsequent behavior based on the order of the behavior stored in the storage component.

3. The control device according to claim 2, wherein
the plurality of behaviors includes at least the scanning behavior of scanning the code symbol attached to the purchased article with the scanner, or an imaging behavior of making an imaging component image an appearance of the purchased article, and
the behavior recognition component is further configured to recognize that the shopper executes the scanning behavior or the imaging behavior based on an output of the scanner or the imaging component.

4. The control device according to claim 1, wherein
the annunciation members include a visual annunciation member, and
the first annunciation configuration by the subsequent behavior annunciation component, the second annunciation configuration by the correct behavior annunciation component, and the warning configuration by the warning component are different in visual annunciation configuration of the visual annunciation member from each other.

5. The control device according to claim 4, wherein
the visual annunciation member includes a light emitting member, and
the first annunciation configuration by the subsequent behavior annunciation component, the second annunciation configuration by the correct behavior annunciation component, and the warning configuration by the warning component unit are different in at least one of a color of light emitted by the light emitting member and a lighting pattern of the light emitting member from each other.

6. The control device according to claim 1, wherein
the control device is comprised in a self-service POS terminal.

7. The control device according to claim 1, wherein
the behavior area comprises a basket table area.

8. A behavior guide system, comprising:
annunciation members disposed so as to correspond respectively to a plurality of behavior areas where a plurality of behaviors included in a series of behaviors to be executed by a shopper is executed, wherein the plurality of behaviors include a scanning behavior of scanning a code symbol attached to a purchased article with a scanner and a behavior to place a scanned article on a predetermined area; and
a control device configured to control the annunciation members, wherein the control device includes
- a behavior recognition component configured to recognize a behavior of the plurality of behaviors executed by the shopper,
- a determination component configured to determine a subsequent behavior of the plurality of behaviors as a behavior for the shopper to subsequently perform based on the behavior recognized by the behavior recognition component,
- a subsequent behavior annunciation component configured to make an annunciation member disposed so as to correspond to a behavior area where the subsequent behavior is to be executed operate in a first annunciation configuration based on the subsequent behavior determined by the determination component,
- a correct behavior annunciation component configured to make the annunciation member, which operates in the first annunciation configuration, operate in a second annunciation configuration different from the first annunciation configuration when the behavior recognition component recognizes that the shopper executes the subsequent behavior, and
- a warning component configured to make the annunciation member, which is disposed so as to correspond to the behavior area where a different behavior from the subsequent behavior is executed, operate in a warning configuration different from the first annunciation configuration and the second annunciation configuration when the behavior recognition component recognizes that the shopper executes the different behavior.

9. The behavior guide system according to claim 8, wherein
the series of behaviors to be executed by the shopper include a plurality of behaviors to be performed by the shopper when executing registration of the purchased article,
the control device further includes a storage component configured to store an order of the plurality of behaviors to be performed when executing the registration of the purchased article, and
the determination component is further configured to determine the subsequent behavior based on the order of the behavior stored in the storage component.

10. The behavior guide system according to claim 9, wherein
the plurality of behaviors includes at least the scanning behavior of scanning the code symbol attached to the purchased article with the scanner, or an imaging behavior of making an imaging component image an appearance of the purchased article, and
the behavior recognition component is further configured to recognize that the shopper executes the scanning behavior or the imaging behavior based on an output of the scanner or the imaging component.

11. The behavior guide system according to claim 8, wherein
the annunciation members include a visual annunciation member, and
the first annunciation configuration by the subsequent behavior annunciation component, the second annunciation configuration by the correct behavior annunciation component, and the warning configuration by the warning component are different in visual annunciation configuration of the visual annunciation member from each other.

12. The behavior guide system according to claim 11, wherein
the visual annunciation member includes a light emitting member, and
the first annunciation configuration by the subsequent behavior annunciation component, the second annunciation configuration by the correct behavior annunciation component, and the warning configuration by the warning component unit are different in at least one of a color of light emitted by the light emitting member and a lighting pattern of the light emitting member from each other.

13. The behavior guide system according to claim 8, wherein
the control device is comprised in a self-service POS terminal.

14. The behavior guide system according to claim 8, wherein
the behavior area comprises a basket table area.

15. A method for controlling a behavior guide system including a processor, a memory, and annunciation members disposed so as to correspond respectively to a plurality of behavior areas where a plurality of behaviors included in a series of behaviors to be executed by a shopper is executed, the method comprising:
- recognizing a behavior of the plurality of behaviors executed by the shopper;
- determining a subsequent behavior of the plurality of behaviors as a behavior for the shopper to subsequently perform based on the behavior recognized in the recognizing the behavior executed by the shopper and an order of the plurality of behaviors stored in the memory;
- making an annunciation member disposed so as to correspond to a behavior area where the subsequent behavior is to be executed operate in a first annunciation configuration based on the subsequent behavior determined in the determining the subsequent behavior as the behavior for the shopper to subsequently perform;
- make the annunciation member, which operates in the first annunciation configuration, operate in a second annunciation configuration different from the first annunciation configuration when recognized in the recognizing the behavior executed by the shopper that the shopper executes the subsequent behavior; and
- making the annunciation member, which is disposed so as to correspond to the behavior area where a different behavior from the subsequent behavior is executed, operate in a warning configuration different from the first annunciation configuration and the second annunciation configuration when recognized in the recognizing the behavior executed by the shopper that the shopper executes the different behavior,
wherein the plurality of behaviors include a scanning behavior of scanning a code symbol attached to a purchased article with a scanner and a behavior to place a scanned article on a predetermined area.

16. The method according to claim 15, wherein
the series of behaviors to be executed by the shopper include a plurality of behaviors to be performed by the shopper when executing registration of the purchased article,
the method further comprising:
- storing the order of the plurality of behaviors to be performed when executing the registration of the purchased article, and determining the subsequent behavior based on the order of the behavior stored.

17. The method according to claim 16, wherein
the plurality of behaviors includes at least the scanning behavior of scanning the code symbol attached to the purchased article with the scanner, or an imaging behavior of making an imaging component image an appearance of the purchased article,
the method further comprising:
recognizing that the shopper executes the scanning behavior or the imaging behavior based on an output of the scanner or the imaging.

18. The method according to claim 15, wherein
the annunciation members include a visual annunciation member, and
the first annunciation configuration, the second annunciation configuration by the correct behavior annunciation, and the warning configuration are different in visual annunciation configuration of the visual annunciation member from each other.

19. The method according to claim 18, wherein
the visual annunciation member includes a light emitting member, and
the first annunciation configuration, the second annunciation configuration, and the warning configuration are different in at least one of a color of light emitted by the light emitting member and a lighting pattern of the light emitting member from each other.

20. The method according to claim 15, wherein
the behavior area comprises a basket table area.

\* \* \* \* \*